(12) United States Patent
Ito

(10) Patent No.: US 9,091,344 B2
(45) Date of Patent: Jul. 28, 2015

(54) MEDIUM PRESSURE CONTROL DEVICE OF CONTINUOUSLY VARIABLE TRANSMISSION AND CONTINUOUSLY VARIABLE TRANSMISSION

(75) Inventor: Yoshio Ito, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 256 days.

(21) Appl. No.: 13/254,058

(22) PCT Filed: Mar. 27, 2009

(86) PCT No.: PCT/JP2009/056308
§ 371 (c)(1),
(2), (4) Date: Aug. 31, 2011

(87) PCT Pub. No.: WO2010/109654
PCT Pub. Date: Sep. 30, 2010

(65) Prior Publication Data
US 2012/0040792 A1    Feb. 16, 2012

(51) Int. Cl.
*F16H 15/50*    (2006.01)
*F16H 61/664*   (2006.01)
*F16H 61/00*    (2006.01)

(52) U.S. Cl.
CPC ........ *F16H 61/6649* (2013.01); *F16H 61/0025* (2013.01); *F16H 61/0031* (2013.01)

(58) Field of Classification Search
CPC . F16H 15/50; F16H 61/0025; F16H 61/0031; F16H 2061/0037
USPC ................................................. 475/115, 114
See application file for complete search history.

(56) References Cited

U.S. PATENT DOCUMENTS

| 5,720,692 | A | 2/1998 | Kashiwabara |
| 6,904,893 | B2 * | 6/2005 | Hotta et al. ................... 123/447 |
| 7,601,088 | B2 * | 10/2009 | Sinojima et al. ............. 475/216 |
| 2004/0171451 | A1 * | 9/2004 | Fuller ........................... 475/115 |
| 2008/0277239 | A1 * | 11/2008 | Gassmann et al. .......... 192/85 R |

FOREIGN PATENT DOCUMENTS

JP    A-H04-181057    6/1992
JP    A-8-277924      10/1996

(Continued)

OTHER PUBLICATIONS

International Search Report dated Jul. 7, 2009 in International Application No. PCT/JP2009/056308 (with translation).

(Continued)

*Primary Examiner* — Justin Holmes
*Assistant Examiner* — Stacey Fluhart
(74) *Attorney, Agent, or Firm* — Oliff PLC

(57) ABSTRACT

A medium pressure control device of a continuously variable transmission includes a pump unit capable of switching a discharge volume of an operating medium to a control system, which controls a contacting surface pressure of rotation members and a transmitting member and the transmission ratio by a pressure of the operating medium, in plural stages; and a transmission ratio control unit that controls the control system and relatively delays a transmission shift when the discharge volume of the operating medium to the control system by the pump unit switches from a relatively small volume to a relatively large volume with the transmission shift.

10 Claims, 9 Drawing Sheets

(56) References Cited

FOREIGN PATENT DOCUMENTS

| JP | A-8-285021 | 11/1996 |
|---|---|---|
| JP | A-2001-324009 | 11/2001 |
| JP | A-2003-194198 | 7/2003 |
| JP | A-2003-336733 | 11/2003 |
| JP | A-2004-360905 | 12/2004 |
| JP | EP 1 482 215 A1 | 12/2004 |
| JP | A-2005-221047 | 8/2005 |
| JP | A-2006-38236 | 2/2006 |
| JP | A-2008-45659 | 2/2008 |

OTHER PUBLICATIONS

English translation of the relevant part of Nov. 5, 2013 Office Action issued in Japanese Patent Application No. 2011-505774.

\* cited by examiner

NEUTRAL POSITION
(TRANSMISSION RATIO FIXED)

F1=F2 ⟶ STROKE AMOUNT FROM
NEUTRAL POSITION
(OFFSET AMOUNT)

TRANSMISSION SHIFT POSITION
(TIME OF TRANSMISSION SHIFT)

MEDIUM PRESSURE CONTROL DEVICE OF CONTINUOUSLY VARIABLE TRANSMISSION AND CONTINUOUSLY VARIABLE TRANSMISSION

TECHNICAL FIELD

The present invention relates to medium pressure control devices of a continuously variable transmission and continuously variable transmissions, and in particular, to a medium pressure control device of a continuously variable transmission for transmitting the drive force from an internal combustion or an electric motor, which is a drive source, to a road surface at an optimum condition corresponding to the traveling state of the vehicle, and a continuously variable transmission.

BACKGROUND ART

A vehicle generally includes a transmission on an output side of the drive source to transmit the drive force, that is, the output torque, from the internal combustion or the electric motor, which is the drive source, to the road surface at an optimum condition corresponding to the traveling state of the vehicle. Such transmission may be a continuously variable transmission for controlling the transmission ratio in a non-step wise manner (continuously) or a discontinuous transmission for controlling the transmission ratio in a step wise manner (discontinuously). The continuously variable transmission or a so-called CVT (Continuously Variable Transmission) includes a troidal type continuously variable transmission and a belt type continuously variable transmission. The troidal type continuously variable transmission transmits the torque between each disc through a power roller serving as a transmitting member sandwiched between an input disc, which is a rotation member on the input side, and an output disc, which is a rotation member on the output side, and also tilts the power roller to change the transmission ratio. The belt type continuously variable transmission is configured by a primary pulley, which is a rotation member on the input side that is transmitted with the drive force from the drive source, a secondary pulley, which is a rotation member on the output side for changing the drive force transmitted to the primary pulley and outputting the same, and a belt serving as a transmitting member for transmitting the drive force transmitted to the primary pulley to the secondary pulley, where the transmission ratio is changed by changing the contact radius of the belt and the pulley.

For instance, the troidal type continuously variable transmission sandwiches a rotation means such as a power roller having the outer peripheral surface as a curved surface that corresponds to the troidal surface between the input disc and the output disc including the troidal surface, and transmits the torque using a shearing force of an oil film of the traction oil formed between the input disc, the output disc, and the power roller. Such power roller is supported in a freely rotating manner by a trunnion, which trunnion is rotatable with the rotation shaft as the center and is movable along the rotation shaft by acting a transmission shift control pressing force by the hydraulic pressure of a hydraulic oil serving as a operating medium supplied to a transmission shift control hydraulic chamber (transmission shift control pressure chamber) with respect to a piston arranged in the trunnion.

Therefore, when the power roller supported by the trunnion moves from a neutral position with respect to the input disc and the output disc to a transmission shift position with the trunnion, a tangent force acts between the power roller and the disc thus causing a side slip, the power roller rotates, that is, tilts with the rotation shaft as a center with respect to the input disc and the output disc, and as a result, the transmission ratio, which is the ratio of the number of rotations of the input disc and the output disc, is changed. The transmission ratio, which is the number of rotations of the input disc and the output disc, is determined based on an angle, that is, a tilt angle, the power roller tilts with respect to the input disc and the output disc, and such tilt angle is determined based on an integral value of the stroke amount (off set amount) serving as the movement amount of the power roller from the neutral position towards the transmission shift position.

The troidal type continuously variable transmission adjusts the contacting surface pressure at the contacting portion of the input disc and the output disc, and the power roller to maintain an appropriate traction state by applying a predetermined sandwiching force for sandwiching the power roller between the input disc and the output disc by a sandwiching means. Such sandwiching means acts the sandwiching force of sandwiching the power roller between the input disc and the output disc by applying a pressure of the hydraulic oil serving as the operating medium supplied to the sandwiching force generating hydraulic chamber (contacting surface pressure control pressure chamber).

Such a hydraulic sandwiching means is also arranged in the belt type continuously variable transmission. In other words, the belt type continuously variable transmission acts the pressure of the hydraulic oil serving as the operating medium supplied to the sandwiching force generating hydraulic chamber (contacting surface pressure control pressure chamber) on the pressure acting surface to push a movable sieve towards the fixing sieve, so that the belt sandwiching force of sandwiching the belt between the movable sieve and the fixing sieve is acted, the belt tensile force is adjusted, and the contacting surface pressure is adjusted at the contacting portion of the pulley and the belt.

With respect to the medium pressure control device of the continuously variable transmission of the conventional art, the hydraulic control device of the continuously variable transmission described in patent document 1, for example, supplies the respective discharge oil of first and second oil pumps to line pressure supply destination (e.g., transmission shift control pressure chamber and contacting surface pressure control pressure chamber) by closing a by-pass oil passage in time of rapid transmission shift to suppress lack of oil at the line pressure supply destination, and also communicates a discharge port side of the first oil pump and an intake port side of the second oil pump with a by-pass oil passage at other than in rapid transmission shift so that the second oil pump uses the high pressure discharge oil in the first oil pump to efficiently take in the hydraulic oil and reduce the loss of pump drive, whereby the first and second oil pumps can be efficiently used.

Patent document 1: Japanese Patent Application Laid-open No. 2005-221047

DISCLOSURE OF INVENTION

Problem to be Solved by the Invention

In the hydraulic control device of the continuously variable transmission described in patent document 1, lack of hydraulic oil may occur at the line pressure supply destination depending on the operation state even if switch is made from a state in which only the discharge oil of the second oil pump is supplied to the line pressure supply destination (e.g., transmission shift control pressure chamber and contacting surface pressure control pressure chamber) to a state in which the respective discharge oil of the first and second oil pumps is supplied to the line pressure supply destination, and hence a more appropriate switching of the discharge volume of the oil pump according to the operation state is desired.

It is an object of the present invention to provide a medium pressure control device of a continuously variable transmission capable of appropriately switching the discharge volume of the operating medium according to the operation state, and a continuously variable transmission.

Means for Solving Problem

In order to achieve the above mentioned object, a medium pressure control device of a continuously variable transmission according to the present invention in which a drive force is transmittable from a rotation member on an input side to a rotation member on an output side through a transmitting member, and in which a transmission ratio or a rotation speed ratio of the rotation member on the input side and the rotation member on the output side is changeable in a non-step wise manner, the medium pressure control device of the continuously variable transmission includes a pump means capable of switching a discharge volume of an operating medium to a control system, which controls a contacting surface pressure of the rotation members and the transmitting member and the transmission ratio by a pressure of the operating medium, in plural stages; and a transmission ratio control means that controls the control system and relatively delays a transmission shift when the discharge volume of the operating medium to the control system by the pump means switches from a relatively small volume to a relatively large volume with the transmission shift.

Further, in the medium pressure control device of a continuously variable transmission, the transmission ratio control means may control the control system and relatively lower a transmission shift speed of the transmission shift when the discharge volume of the operating medium to the control system by the pump means switches from a relatively small volume to a relatively large volume with the transmission shift.

Further, in the medium pressure control device of a continuously variable transmission, the transmission ratio control means may control the control system and relatively delay a start time point of the transmission shift when the discharge volume of the operating medium to the control system by the pump means switches from a relatively small volume to a relatively large volume with the transmission shift.

Further, in the medium pressure control device of a continuously variable transmission, the transmission ratio control means may delay the transmission shift in a period from start of the switching of the discharge volume of the pump means to end of the switching of an actual discharge volume of the pump means to a relatively large volume.

Further, the medium pressure control device of a continuously variable transmission may further include a switching control means that controls the pump means and relatively increases a switching speed of the discharge volume of the operating medium to the control system when the transmission ratio control means controls the control system and delays the transmission shift.

Further, in the medium pressure control device of a continuously variable transmission, the pump means may include a first pump that discharges the operating medium to the control system, a second pump that discharges the operating medium to the control system or a supply system different from the control system, and a switching means capable of switching a discharging destination of the operating medium in the second pump between the control system and the supply system.

Further, in the medium pressure control device of a continuously variable transmission, the control system may be configured to include a transmission ratio changing means that changes the transmission ratio by a pressure of the operating medium supplied to a transmission shift control pressure chamber, and a contacting surface pressure changing means that changes the contacting surface pressure by a pressure of the operating medium supplied to a contacting surface pressure control pressure chamber.

In order to achieve the above mentioned object, a continuously variable transmission according to the present invention includes the medium pressure control device of the continuously variable transmission; and a power roller configuring the transmission member.

In order to achieve the above mentioned object, a continuously variable transmission according to the present invention includes the medium pressure control device of the continuously variable transmission; and a belt configuring the transmission member.

Effect of the Invention

According to the medium pressure control device of the continuously variable transmission of the present invention, the discharge volume of the operating medium can be appropriately switched according to the operation state.

According to the continuously variable transmission of the present invention, the discharge volume of the operating medium can be appropriately switched according to the operation state.

EXPLANATIONS OF LETTERS OR NUMERALS

1 Troidal type continuously variable transmission (continuously variable transmission)
1A Vehicle
2 Input disc (rotation member on input side)
3 Output disc (rotation member on output side)
4 Power roller (transmitting member)
5 Transmission ratio changing unit (transmission ratio changing means)
9 Hydraulic control device (medium pressure control device)
15 Hydraulic pressing mechanism (contacting surface pressure changing means)
15a Sandwiching force generating hydraulic chamber (contacting surface pressure control pressure chamber)
65 Transmission ratio controller (transmission ratio control means)
66 Switching controller (switching control means)
82 Transmission shift control hydraulic chamber (transmission shift control pressure chamber)
90A Control system
90B Lubricating system (supply system)
91 Oil pan
92 Pump device (pump means)
96 Main pump (first pump)
97 Sub-pump (second pump)
98 Switching valve (switching means)
101 Belt type continuously variable transmission (continuously variable transmission)
102 Primary pulley (rotation member on input side, transmission ratio changing means)
103 Secondary pulley (rotation member on output side, contacting surface pressure changing means)
104 Belt (transmitting member)
124 Primary hydraulic chamber (transmission shift control pressure chamber)
134 Secondary hydraulic chamber (contacting surface pressure control pressure chamber)

BEST MODE(S) FOR CARRYING OUT THE INVENTION

An embodiment of a medium pressure control device of a continuously variable transmission, and a continuously variable transmission according to the present invention will be hereinafter described in detail based on the drawings. It is to be noted that the present invention is not limited to such embodiment. The configuring elements in the embodiment described below include elements that can be replaced or easily contrived by those skilled in the art or elements that are substantially the same.

(Embodiment)

Figure 1:
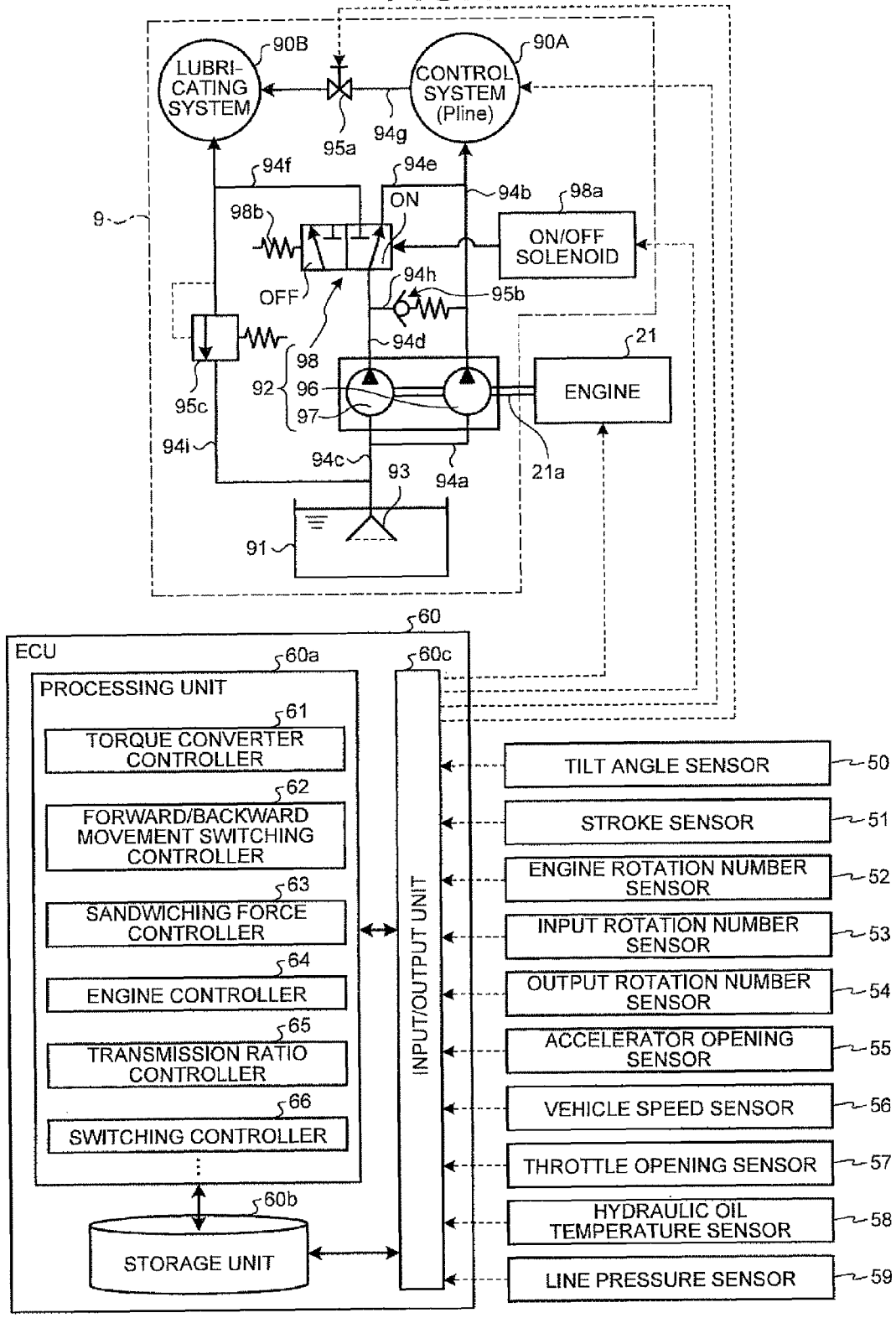
FIG. 1 is a schematic configuration view of a hydraulic control device according to an embodiment of the present invention.
Figure 2:
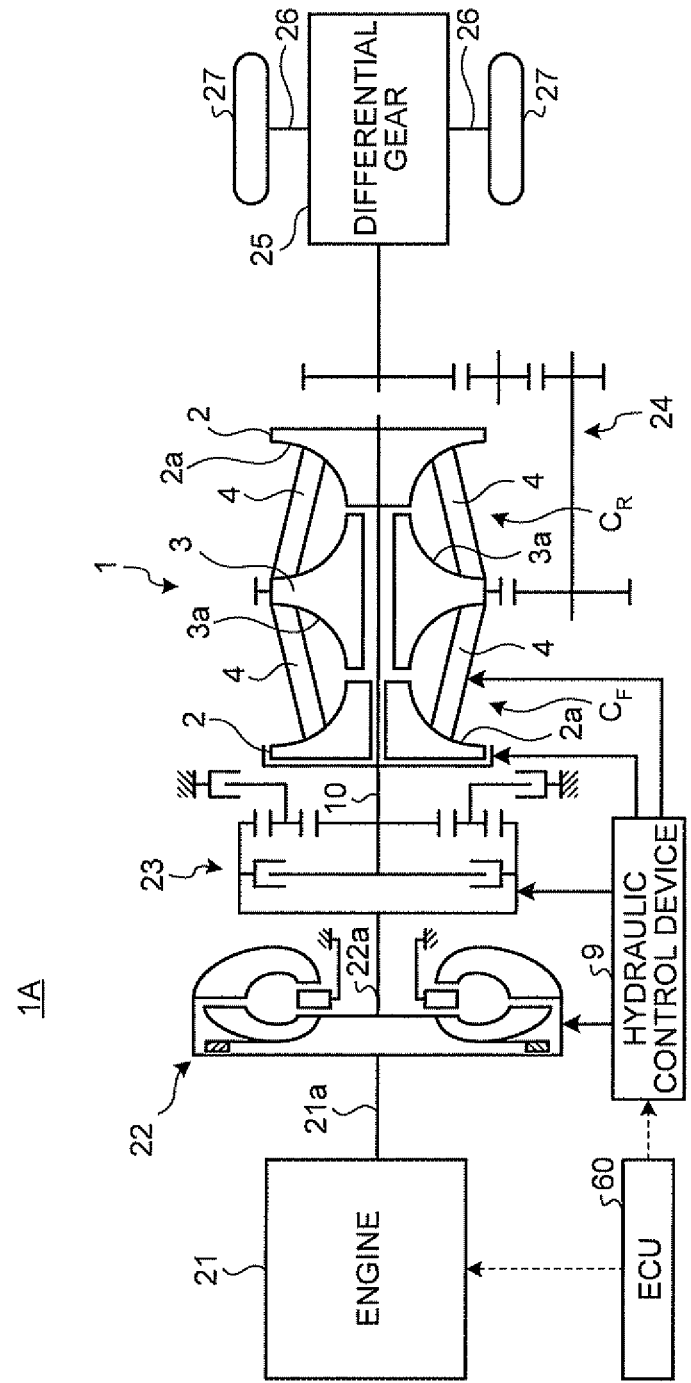
FIG. 2 is a schematic configuration diagram of a power transmission system of a vehicle mounted with a troidal type continuously variable transmission in which the hydraulic control device according to the embodiment of the present invention is applied.
Figure 3:
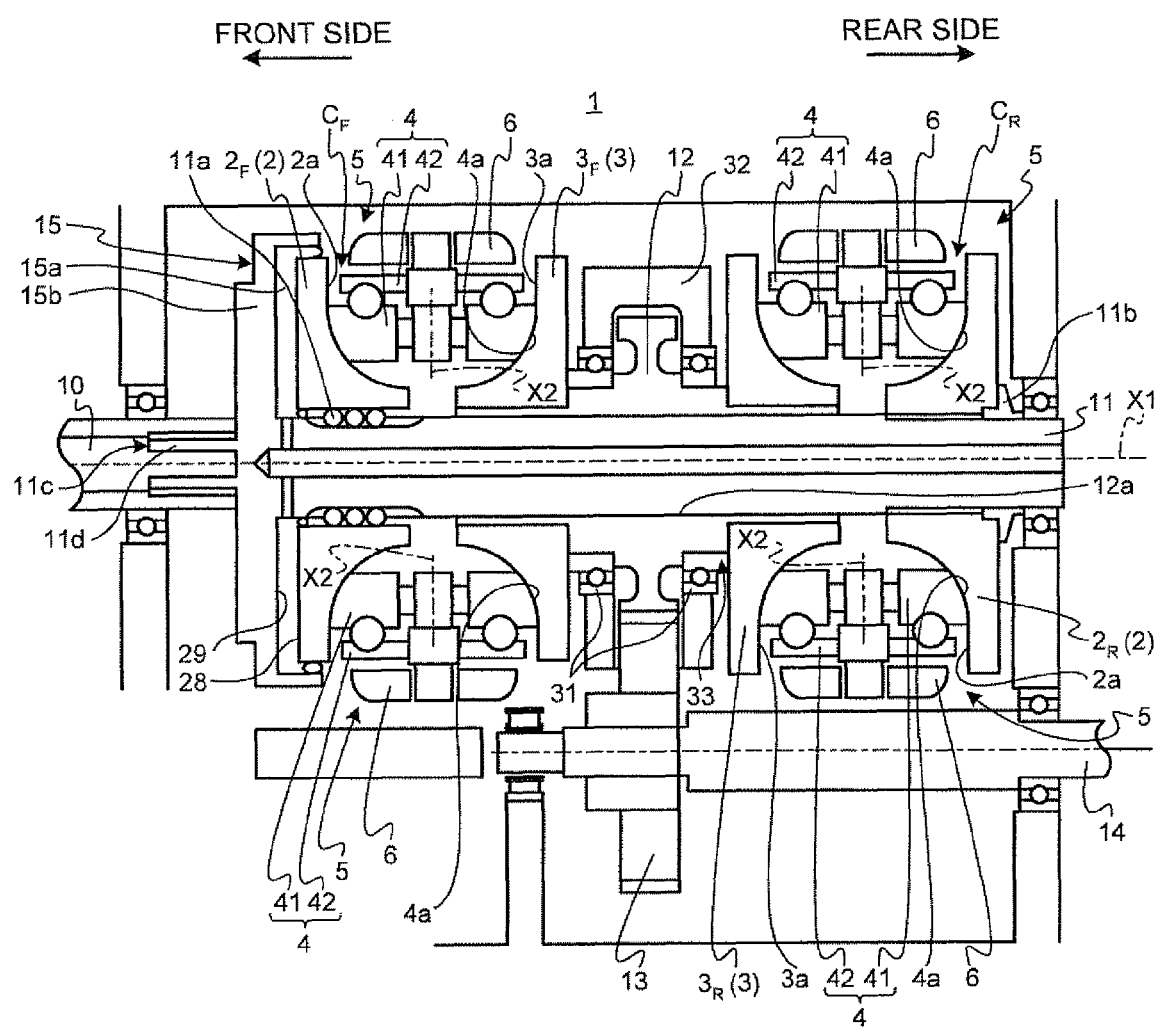
FIG. 3 is a schematic cross-sectional view of the troidal type continuously variable transmission in which the hydraulic control device according to the embodiment of the present invention is applied.
Figure 4:
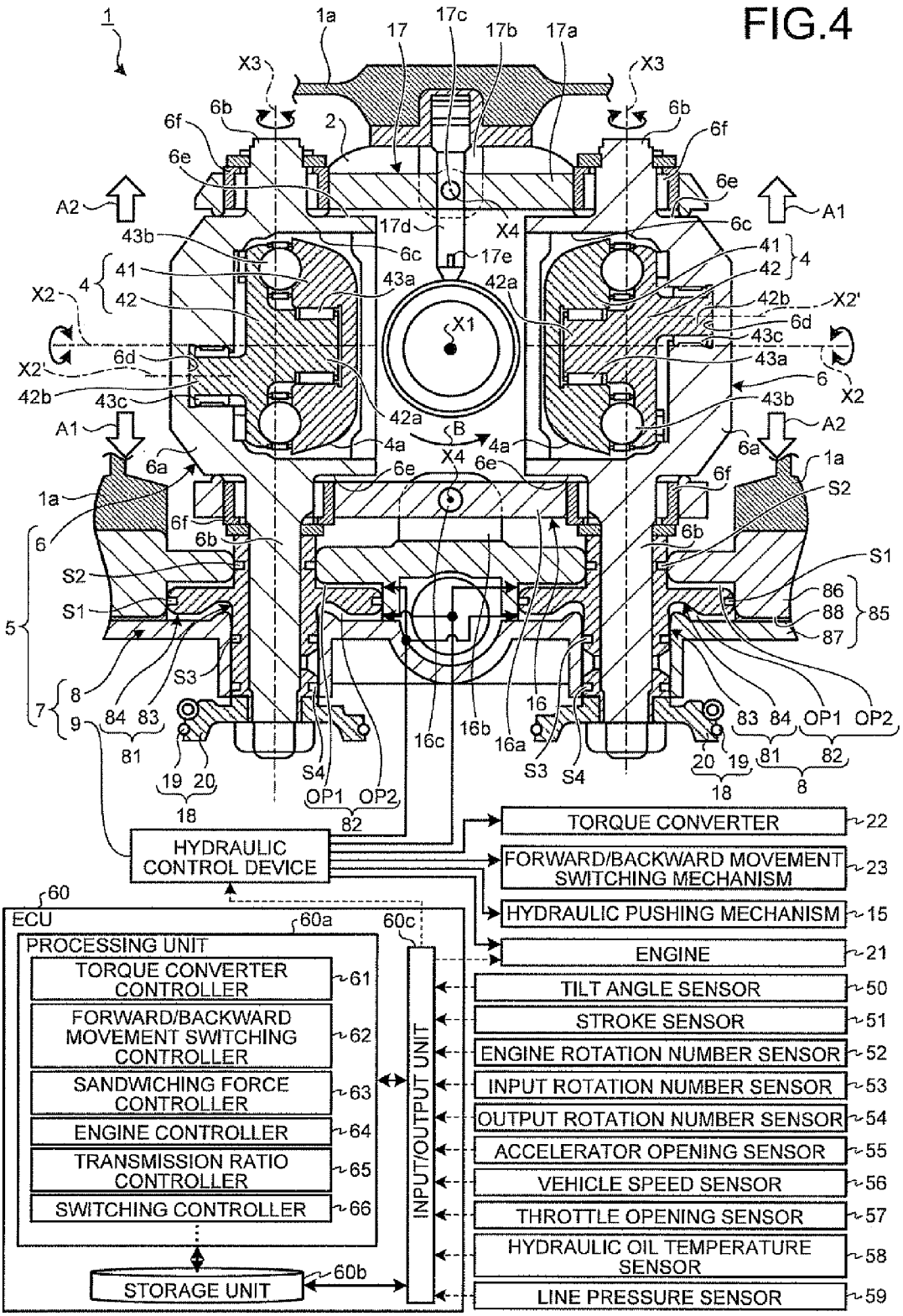
FIG. 4 is a schematic configuration diagram of the main parts of the troidal type continuously variable transmission in which the hydraulic control device according to the embodiment of the present invention is applied.
Figure 5:
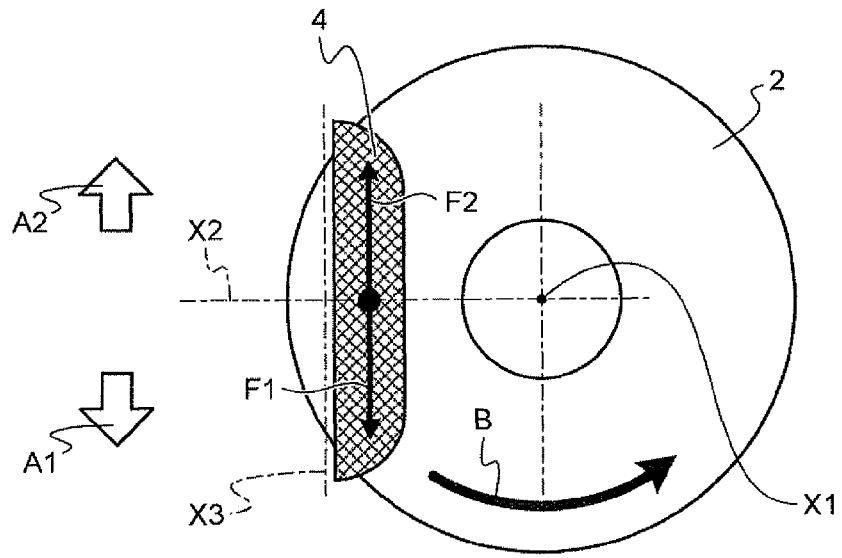
FIG. 5 is a schematic view describing a neutral position with respect to an input disc of a power roller arranged in the troidal type continuously variable transmission in which the hydraulic control device according to the embodiment of the present invention is applied.
Figure 6:
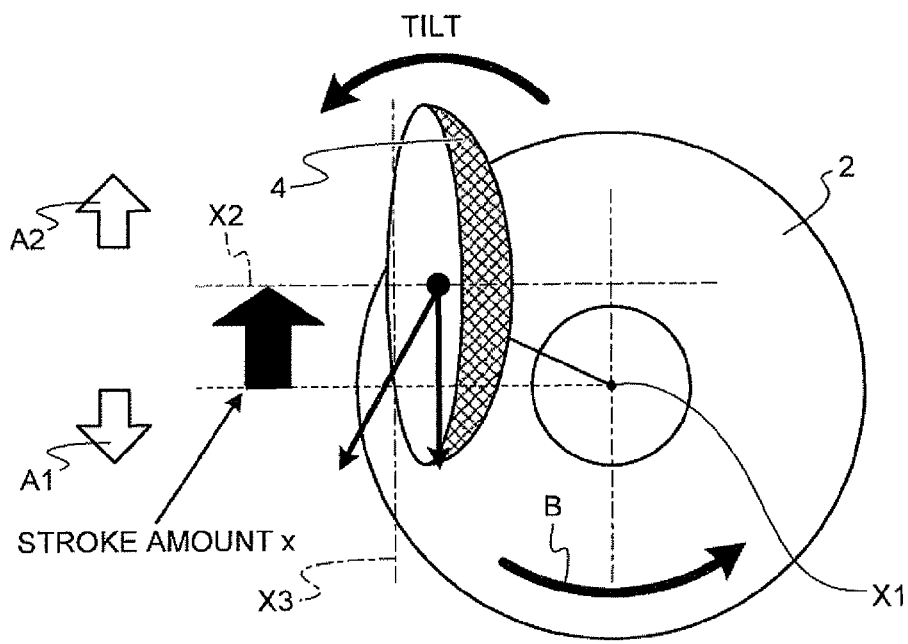
FIG. 6 is a schematic view describing a transmission shift position with respect to the input disc of the power roller arranged in the troidal type continuously variable transmission in which the hydraulic control device according to the embodiment of the present invention is applied.
Figure 7:
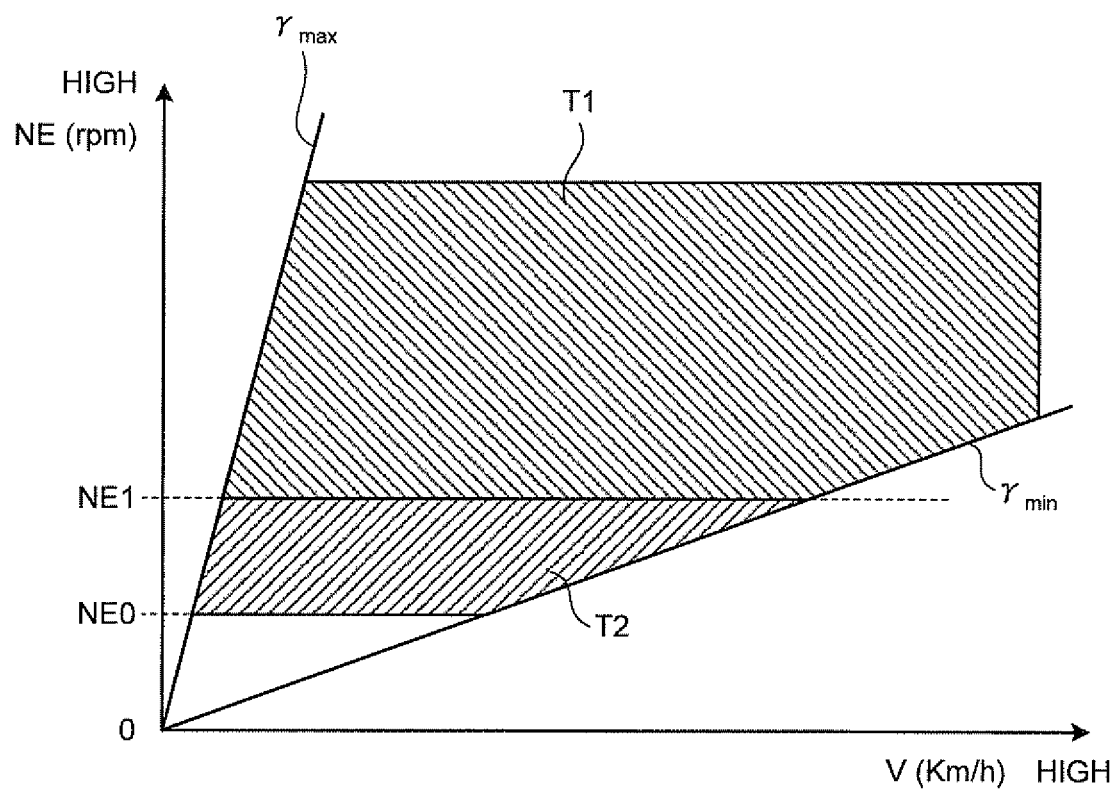
FIG. 7 is a diagrammatic view describing the switching of the discharge volume in the hydraulic control device according to the embodiment of the present invention.
Figure 8:
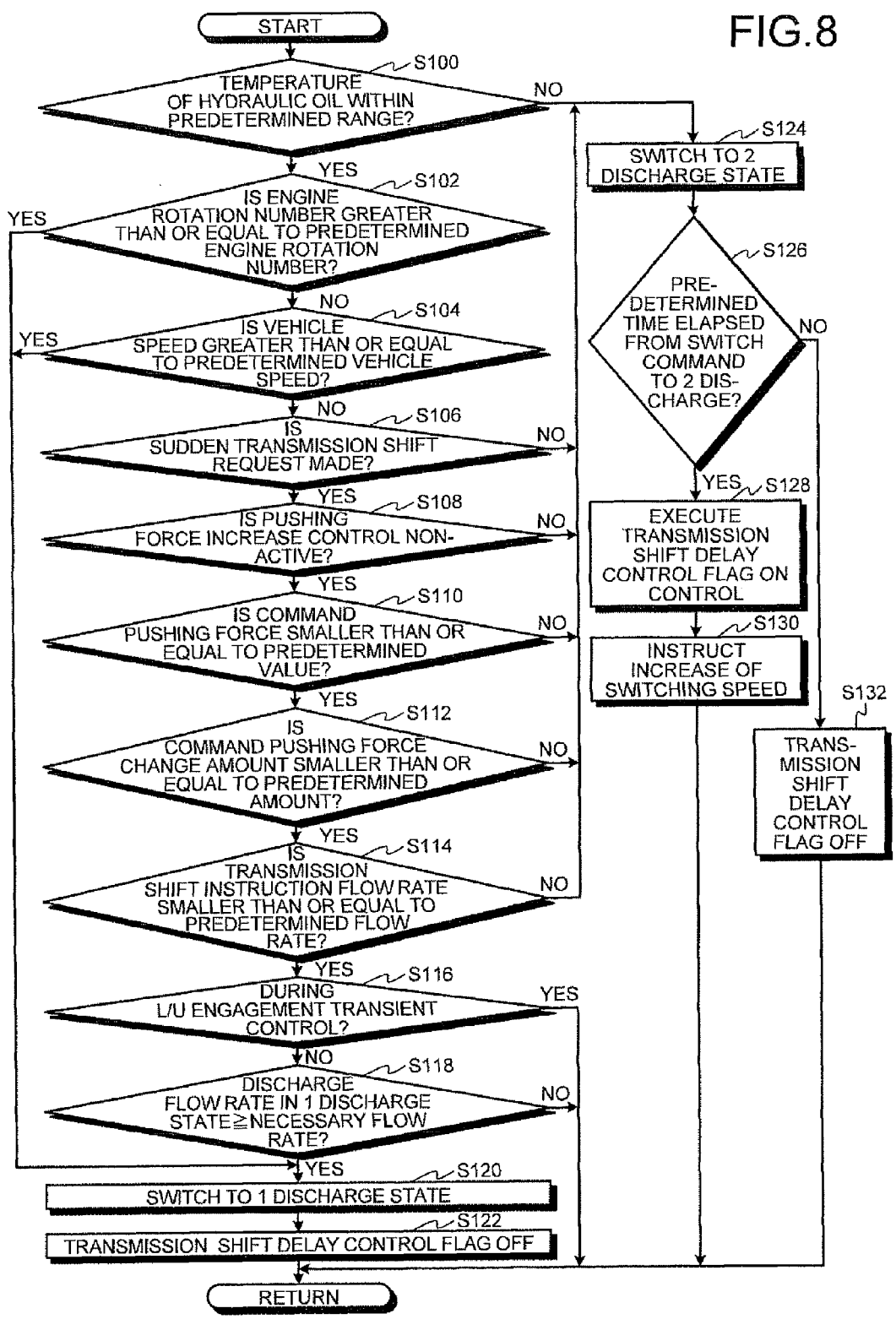
FIG. 8 is a flowchart describing a switching control of the discharge volume of the pump device of the hydraulic control device according to the embodiment of the present invention.
Figure 9:
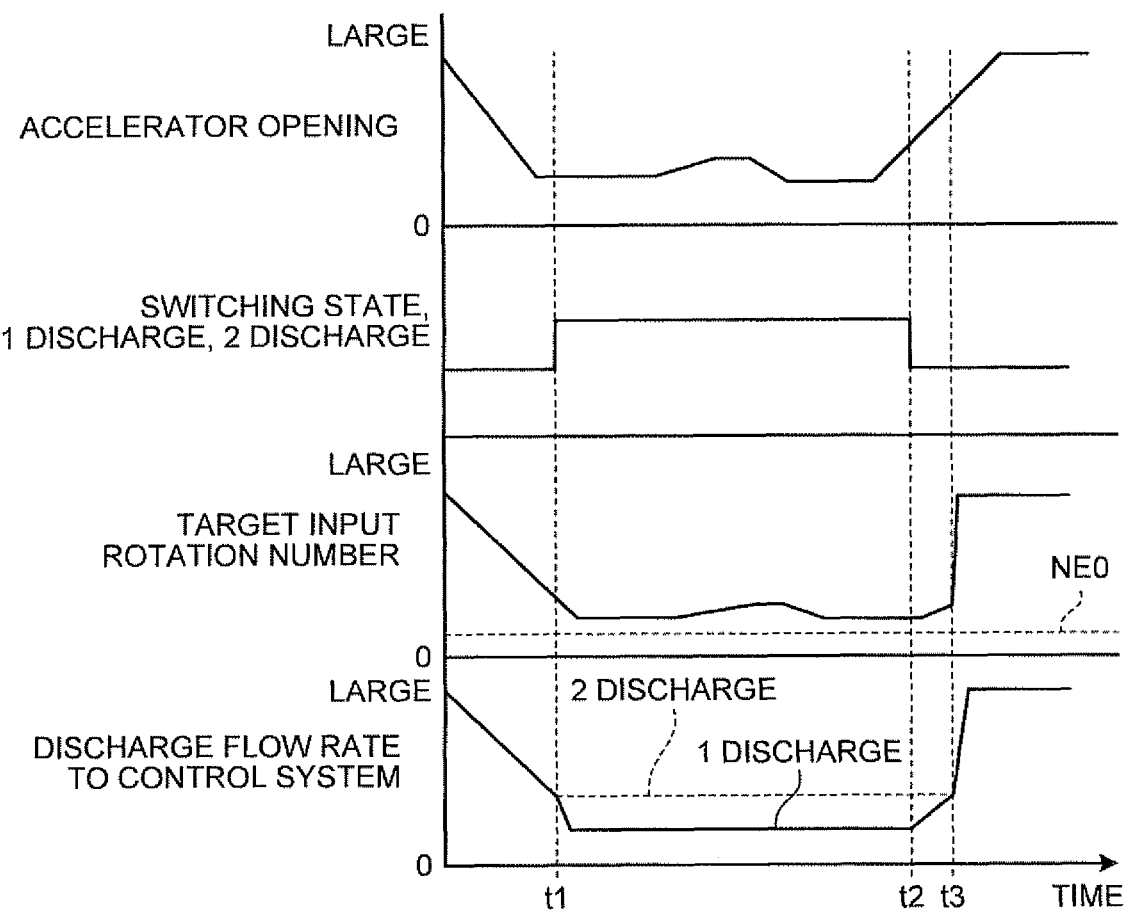
FIG. 9 is a timing chart describing one example of the switching control of the discharge volume of the pump device of the hydraulic control device according to the embodiment of the present invention.

FIG. 1 is a schematic configuration view of a hydraulic control device according to an embodiment of the present invention, FIG. 2 is a schematic configuration diagram of a power transmission system of a vehicle mounted with a troidal type continuously variable transmission in which the hydraulic control device according to the embodiment of the present invention is applied, FIG. 3 is a schematic cross-sectional view of the troidal type continuously variable transmission in which the hydraulic control device according to the embodiment of the present invention is applied, FIG. 4 is a schematic configuration diagram of the main parts of the troidal type continuously variable transmission in which the hydraulic control device according to the embodiment of the present invention is applied, FIG. 5 is a schematic view describing a neutral position with respect to an input disc of a power roller arranged in the troidal type continuously variable transmission in which the hydraulic control device according to the embodiment of the present invention is applied, FIG. 6 is a schematic view describing a transmission shift position with respect to the input disc of the power roller arranged in the troidal type continuously variable transmission in which the hydraulic control device according to the embodiment of the present invention is applied, FIG. 7 is a diagrammatic view describing the switching of the discharge volume in the hydraulic control device according to the embodiment of the present invention, FIG. 8 is a flowchart describing a switching control of the discharge volume of the pump device of the hydraulic control device according to the embodiment of the present invention, and FIG. 9 is a timing chart describing one example of the switching control of the discharge volume of the pump device of the hydraulic control device according to the embodiment of the present invention.

FIG. 4 is a view illustrating an arbitrary power roller of each power roller configuring a troidal type continuously variable transmission serving as a continuously variable transmission, and an input disc to be brought into contact with the power roller. FIG. 5 and FIG. 6 are views of the input disc seen from the output disc side, and schematically illustrate only one of each of the input disc and the power roller.

In the embodiment described below, an internal combustion engine (gasoline engine, diesel engine, LPG engine, etc.) that generates an engine torque is used for the drive source for generating a driving force to be transmitted to the continuously variable transmission of the present invention, but is not limited thereto, and an electric motor such as a motor that generates a motor torque may be used for the drive source. The internal combustion engine and the electric motor may be simultaneously used for the drive source.

As illustrated in FIG. 2, a troidal type continuously variable transmission 1 serving as a continuously variable transmission applied with the medium pressure control device according to the present embodiment is a so-called CVT (Continuously Variable Transmission) that transmits the drive force, that is, the output torque from an engine 21 serving as a drive source mounted on a vehicle 1A, to a drive wheel 27 at an optimum condition corresponding to the traveling state of the vehicle 1A, and controls the transmission ratio in a non-step wise manner (continuously). The troidal type continuously variable transmission 1 is a so-called troidal type continuously variable transmission that transmits the torque between each input disc 2 and output disc 3 through a power roller 4 sandwiched between the input disc 2 and the output disc 3 and tilts the power roller 4 to change the transmission ratio. In other words, the troidal type continuously variable transmission 1 sandwiches the power roller 4, in which the outer circumferential surface is the curved surface corresponding to troidal surfaces 2a, 3a, between the input disc 2 and the output disc 3 including the troidal surfaces 2a, 3a, and transmits the torque using the shearing force of the oil film of the traction oil formed between the input disc 2, the output disc 3, and the power roller 4. The troidal type continuously variable transmission 1 tilts the power roller 4 arranged between the input disc 2, to which the drive force is input, and the output disc 3, from which the drive force is output, to change the transmission ratio or the rotation speed ratio of the input disc 2 and the output disc 3 in a non-step wise manner.

Specifically, as illustrated in FIG. 2, FIG. 3, and FIG. 4, the troidal type continuously variable transmission 1 includes the input disc 2 serving as a rotation member on the input side, the output disc 3 serving as a rotation member on the output side, the power roller 4 serving as a transmitting member, and a transmission ratio changing unit 5 serving as a transmission ratio changing means. The transmission ratio changing unit 5 includes a trunnion 6 serving as a supporting means, and a moving portion 7. The moving portion 7 includes a hydraulic piston section 8 and a hydraulic control device 9 serving as a medium pressure control device. The troidal type continuously variable transmission 1 includes an electronic control unit (ECU) 60 for controlling each unit of the troidal type continuously variable transmission 1. In the troidal type continuously variable transmission 1, the power roller 4 arranged contacting the input disc 2 and the output disc 3 moves from the neutral position to the transmission shift position with respect to the input disc 2 and the output disc 3 by the moving portion 7, so that the transmission ratio or the rotation number ratio of the input disc 2 and the output disc 3 is changed.

The input disc 2 of the present embodiment corresponds to the rotation member on the input side and also corresponds to a first sandwiching member for acting the sandwiching force on the power roller 4, and the output disc 3 corresponds to the rotation member on the output side and also corresponds to a second sandwiching member for acting the sandwiching force on the power roller 4.

The input disc 2 is transmitted (input) with the drive force (torque) from the engine 21 through a torque converter 22 or a starting mechanism and a fluid transmitting device, a forward/backward movement switching mechanism 23, and the like.

The engine 21 outputs the engine torque, that is, the drive force, for moving the vehicle mounted with the engine 21 forward or backward. The engine 21 is electrically connected to the ECU 60, where the drive is controlled by the ECU 60 and the drive force to output is controlled. The drive force from the engine 21 is transmitted to the torque converter 22 through a crankshaft 21*a*.

The torque converter 22 transmits the drive force from the engine 21 to the troidal type continuously variable transmission 1 through the forward/backward movement switching mechanism 23. The torque converter 22 includes a pump (pump impeller), a turbine (turbine runner), a stator, and a lockup clutch. The pump is coupled to the crankshaft 21*a* of the engine 21 through the front cover, or the like, and is rotatably arranged with the crankshaft 21*a* and the front cover. The turbine is arranged to face the pump. The turbine is coupled to an input shaft 10 through an input shaft 22*a* and the forward/backward movement switching mechanism 23, and is arranged so as to be rotatable about the axis line same as the crankshaft 21*a* with the input shaft 10. The stator is arranged between the pump and the turbine. The lockup clutch is arranged between the turbine and the front cover, and is coupled to the turbine.

Therefore, the torque converter 22 has the drive force (engine torque) of the engine 21 transmitted from the crankshaft 21*a* to the pump through the front cover. If the lockup clutch is released, the drive force transmitted to the pump is transmitted to the turbine, the input shaft 22*a* and the input shaft 10 through the hydraulic oil or the operating fluid interposed between the pump and the turbine. In this case, the torque converter 22 can change the flow of the hydraulic oil circulating between the pump and the turbine to obtain predetermined torque characteristics. If the lockup clutch coupled to the turbine is engaged to the front cover, the torque converter 22 has the drive force from the engine 21 transmitted to the pump through the front cover directly transmitted to the input shaft 10 without passing the hydraulic oil. The ON/OFF control for carrying out engagement and disengagement, that is, ON and OFF of the lockup clutch is carried out by the hydraulic oil supplied from the hydraulic control device 9, to be described later. The hydraulic control device 9 is connected to the ECU 60, to be described later. Therefore, the ON/OFF control of the lockup clutch is carried out by the ECU 60.

The forward/backward movement switching mechanism 23 transmits the drive force from the engine 21 transmitted through the torque converter 22 to the input disc 2 of the troidal type continuously variable transmission 1. The forward/backward movement switching mechanism 23 is configured by a planetary gear train, a forward clutch (friction clutch), and a reverse brake (friction brake), and transmits the drive force of the engine 21 to the input disc 2 directly or in an inverted manner. That is, the drive force of the engine 21 through the forward/backward movement switching mechanism 23 is transmitted to the input disc 2 as the positive rotation drive force acting in the direction of positive rotating the input disc 2 (direction the input disc 2 rotates when the vehicle moves forward), or as the negative rotation drive force acting in the direction of negative rotating the input disc (direction the input disc 2 rotates when the vehicle moves backward). The switching control of the transmitting direction of the drive force by the forward/backward movement switching mechanism 23 is carried out by executing the ON/OFF control of performing engagement and disengagement, that is, ON and OFF of the forward clutch and the reverse brake. The switching control of the transmitting direction of the drive force by the forward/backward movement switching mechanism 23, that is, the ON/OFF control of the forward clutch and the reverse brake is carried out by the hydraulic oil supplied from the hydraulic control device 9, to be described later. Therefore, the switching control of the forward/backward movement switching mechanism 23 is carried out by the ECU 60.

The forward/backward movement switching mechanism 23 has the forward clutch turned ON and the reverse brake turned OFF at the time of the forward traveling of the vehicle. At the time of the backward traveling of the vehicle, the forward clutch is turned OFF and the reverse brake is turned ON. Thus, the forward/backward movement switching mechanism 23 can switch the rotation direction of the torque. The forward/backward movement switching mechanism 23 has the forward clutch turned OFF and the reverse brake turned OFF at the neutral time.

Two input discs 2 are coupled to the input shaft 10 rotated based on the rotation of the engine 21, and are arranged in a freely rotating manner by the input shaft 10. Furthermore, each input disc 2 is rotated by a variator shaft 11 that performs the same rotation as the input shaft 10. Therefore, each input disc 2 is rotatable with the rotation axis line X1 of the input shaft 10 serving as a disc rotation axis line as the center of rotation. The troidal type continuously variable transmission 1 includes a front side input disc $2_F$ on the front side (engine 21 side) with respect to the variator shaft 11, and includes a rear side input disc $2_R$ on the rear side (drive wheel 27 side) with a predetermined spacing with respect to the front side input disc $2_F$ in a direction along the rotation axis line X1.

The front side input disc $2_F$ is supported by the variator shaft 11 through a ball spline 11a. That is, the front side input disc $2_F$ is supported by the variator shaft 11 so as to be rotatable with the rotation of the variator shaft 11, and movable in a direction along the rotation axis line X1 with respect to the variator shaft 11. In other words, the front side input disc $2_F$ does not relatively rotationally displace about the rotation axis line X1 but relatively displaces in a direction along the rotation axis line X1 with respect to the variator shaft 11.

The rear side input disc $2_R$ is supported by the variator shaft 11 through a spline fit-in portion, and has the movement to the rear side along the rotation axis line X1 limited by a loading nut 11b arranged at the rear side end of the variator shaft 11. The loading nut 11b is screw fitted to the rear side end of the variator shaft 11, and receives the pressing force from a hydraulic pressing mechanism 15 to limit the movement of the rear side input disc $2_R$ to the rear side. That is, the rear side input disc $2_R$ is supported by the variator shaft 11 so as to be rotatable with the rotation of the variator shaft 11, has the relative movement to the rear side with respect to the variator shaft 11 limited at a predetermined position by the loading nut 11b, and movable with the movement of the variator shaft 11 to the front side along the rotation axis line X1. In other words, the rear side input disc $2_R$ does not relatively rotationally displace about the rotation axis line X1 and does not relatively displace in the direction along the rotation axis line X1 with respect to the variator shaft 11 when the pressing force from the hydraulic pressing mechanism 15, to be described later, acts on the loading nut 11b. In the following description, the front side input disc $2_F$ and the rear side input disc $2_R$ are simply noted as "input disc 2" unless distinction is particularly necessary.

Each input disc 2 has an opening at the middle, and has a shape that gradually projects out from the outer side towards the middle side. The inclined surface of the projecting portion of each input disc 2 is formed so that the cross-section along the direction of the rotation axis line X1 becomes substantially an arcuate shape, and constitutes the troidal surface 2a of each input disc 2. The two input discs 2 are arranged such that the troidal surfaces 2a face each other.

The output disc 3 transmits (outputs) the drive force transmitted (input) to each input disc 2 to the drive wheel 27 side, and a total of two, on for each corresponding input disc 2, is arranged. The troidal type continuously variable transmission 1 includes a front side output disc $3_F$ on the front side (engine 21 side) and a rear side output disc $3_R$ on the rear side (drive wheel 27 side) with respect to the variator shaft 11. The front side output disc $3_F$ and the rear side output disc $3_R$ are both arranged between the front side input disc $2_F$ and the rear side input disc $2_R$ with respect to the direction along the rotation axis line X1, and furthermore, the rear side output disc $3_R$ is arranged between the front side output disc $3_F$ and the rear side input disc $2_R$. That is, the troidal type continuously variable transmission 1 includes the front side input disc $2_F$, the front side output disc $3_F$, the rear side output disc $3_R$, and the rear side input disc $2_R$ in such order from the front side with respect to the direction along the rotation axis line X1. In the following description, the front side output disc $3_F$ and the rear side output disc $3_R$ are simply noted as "output disc 3" unless distinction is particularly necessary.

Each input disc 2 and each output disc 3 are arranged in a freely rotatable manner coaxially with the rotation axis line X1. Therefore, each output disc 3 is rotatable with the rotation axis line X1 as the center of rotation. Each output disc 3 has substantially the same shape as each input disc 2, that is, each output disc 3 has an opening at the middle, and has a shape that gradually projects out from the outer side towards the middle side. The inclined surface of the projecting portion of each output disc 3 is formed so that the cross-section along the direction of the rotation axis line X1 becomes substantially an arcuate shape, and constitutes the troidal surface 3a of each output disc 3.

Each output disc 3 is arranged between the two input discs 2 with respect to a direction along the rotation axis line X1 as described above, and is arranged such that each troidal surface 3a faces the troidal surfaces 2a of each input disc 2, respectively. In other words, in the cross-section along the rotation axis line X1, the troidal surface 2a of one front side input disc $2_F$ and the troidal surface 3a of the front side output disc $3_F$ face each other to form the front side (drive source side) cavity $C_F$, and the troidal surface 2a of the other rear side input disc $2_R$ and the troidal surface 3a of the rear side output disc $3_R$ face each other to form a different rear side (drive wheel side) cavity $C_R$.

Each output disc 3 is supported through the spline engagement portion by a cylindrical sleeve of a output gear 12 arranged between the two output discs 3. That is, each output disc 3 and the output gear 12 are coupled to be integrally rotatable. The output gear 12 is supported in a freely rotating manner with the displacement along the rotation axis line X1 regulated by a pair of bearings 31 (see FIG. 3) with respect to an intermediate wall 32 (see FIG. 3) arranged on an inner side of a casing 1a (see FIG. 4) by being fixed to the casing 1a. The output gear 12 has the variator shaft 11 inserted to a throughhole 12a on the inner side in the radial direction and is supported in a relatively rotatable manner with respect to the variator shaft 11. Therefore, each output disc 3 is supported in a relatively rotatable manner with respect to the variator shaft 11 with the output gear 12.

That is, the troidal type continuously variable transmission 1 has the intermediate wall 32 positioned by the casing 1a, the bearing 31 positioned by the intermediate wall 32, the output gear 12 positioned by the bearing 31, and each output disc 3 positioned by the output gear 12 so that each output disc 3 is positioned with respect to the casing 1a.

The variator shaft 11 is supported in a relatively rotatable manner with respect to the casing 1a (see FIG. 4) through an axial central supporting portion 33 including the output gear 12, the bearing 31, the intermediate wall 32, and the like at the central part in the direction along the rotation axis line X1. That is, the troidal type continuously variable transmission 1 is a troidal type continuously variable transmission 1 of a double cavity type including the front side cavity $C_F$ formed by the front side input disc $2_F$ and the front side output disc $3_F$, and the rear side cavity $C_R$ formed by the rear side input disc $2_R$ and the rear side output disc $3_R$, where the variator shaft 11 on which the front side input disc $2_F$, the rear side input disc $2_R$, the front side output disc $3_F$, and the rear side output disc $3_R$ are arranged is supported in a relatively rotatable manner with respect to the casing 1a (see FIG. 4) through the axial central supporting portion 33 between the front side cavity $C_F$ and the rear side cavity $C_R$ with respect to the direction along the rotation axis line X1.

Furthermore, a counter gear 13 is geared to the output gear 12, and an output shaft 14 is coupled to the counter gear 13. Therefore, when the output gear 12 rotates with the rotation of each output disc 3, and the counter gear 13 geared with the output gear 12 rotates, the output shaft 14 rotates. The output shaft 14 is connected to the drive wheel 27 through a power transmission mechanism 24, a differential gear 25, and the like, so that the drive force is transmitted (output) to the drive wheel 27 through the power transmission mechanism 24, the differential gear 25, and the like.

The power transmission mechanism 24 transmits the drive force between the troidal type continuously variable transmission 1 and the differential gear 25. The power transmission mechanism 24 is arranged between the output disc 3 and the differential gear 25. The differential gear 25 transmits the drive force between the power transmission mechanism 24 and the drive wheel 27. The differential gear 25 is arranged between the power transmission mechanism 24 and the drive wheel 27. A drive shaft 26 is coupled to the differential gear 25. The drive wheel 27 is attached to the drive shaft 26.

The power roller 4 is arranged between the input disc 2 and the output disc 3 while contacting the input disc 2 and the output disc 3, and transmits the drive force from the input disc 2 to the output disc 3. In other words the power roller 4 has the outer peripheral surface formed as a contacting surface 4a of curved surface shape corresponding to the troidal surfaces 2a, 3a. The power roller 4 is sandwiched between the input disc 2 and the output disc 3 so that the contacting surface 4a can be brought into contact with the troidal surfaces 2a, 3a, and each power roller 4 is supported in a freely rotating manner with the rotation axis line X2 serving as a rotation axis line of the power roller as the center of rotation while having the contacting surface 4a contacting the troidal surfaces 2a, 3a by the trunnion 6, to be described later. The power roller 4 transmits the drive force (torque) using the shearing force of the oil film formed between the troidal surfaces 2a, 3a of the input disc 2 and the output disc 3 and the contacting surface 4a of the power roller 4 by the traction oil supplied to the troidal type continuously variable transmission 1.

A total of four power rollers 4, two for one cavity formed by a pair of input disc 2 and output disc 3, are arranged. In other words, the troidal type continuously variable transmission 1 has two power rollers 4 arranged as a pair with respect to the front side cavity $C_F$, and two power rollers 4 arranged as a pair with respect to the rear side cavity $C_R$. The power rollers 4 arranged in a pair with respect to each of the front side cavity $C_F$ and the rear side cavity $C_R$ are arranged facing each other with the rotation axis line X1 in between.

More specifically, the power roller 4 is configured by a power roller main body 41 and an outer ring 42. The power roller main body 41 has the contacting surface 4a, described above, that is brought into contact with the troidal surfaces 2a, 3a of the input disc 2 and the output disc 3 formed on the outer peripheral surface. The power roller main body 41 is supported in a freely rotating manner through a bearing (radial bearing) 43a with respect to a rotation shaft 42a formed in the outer ring 42. The power roller main body 41 is also supported in a freely rotating manner through a bearing (thrust bearing) 43b with respect to the surface facing the power roller main body 41 of the outer ring 42. Therefore, the power roller main body 41 is rotatable with the rotation axis line X2 of the rotation shaft 42a as the center of rotation.

The outer ring 42 is formed with an eccentric shaft 42b along with the rotation shaft 42a. The eccentric shaft 42b is formed such that a rotation axis line X2' is at a position shifted with respect to the rotation axis line X2 of the rotation shaft 42a. The eccentric shaft 42b is supported in a freely rotating manner through a bearing (radial bearing) 43c with respect to a fit-in portion 6d formed as a recess in a roller supporting portion 6a of the trunnion 6, to be described later. Therefore, the outer ring 42 is rotatable with the rotation axis line X2' of the eccentric shaft 42b as the center. That is, the power roller 4 is rotatable with the rotation axis line X2 and the rotation axis line X2' as the center, that is, can revolve with the rotation axis line X2' as the center and spin with the rotation axis line X2 as the center with respect to the trunnion 6. The power roller 4 thus has a configuration of being movable in a direction along the rotation axis line X1, and hence variation in component deformation and component accuracy can be permitted.

The input shaft 10 is connected to a hydraulic pressing (end road) mechanism 15 serving as a contacting surface pressure changing means.

The hydraulic pressing mechanism 15 is a sandwiching means for bringing the input disc 2 and the output disc 3, and the power roller 4 into contact, and acting a sandwiching force for sandwiching the power roller 4 between the input disc 2, which is the first sandwiching member, and the output disc 3, which is the second sandwiching member. The hydraulic pressing mechanism 15 changes the contacting surface pressure acting on the contacting portion of the troidal surfaces 2a, 3a of the input disc 2, the output disc 3 and the contacting surface 4a of the power roller 4 by changing the sandwiching force for sandwiching the power roller 4. The hydraulic pressing mechanism 15 acts the pressure of the hydraulic oil serving as the operating medium supplied to a sandwiching force generating hydraulic chamber 15a serving as a contacting surface pressure control pressure chamber, that is, the sandwiching force for sandwiching the power roller 4 between the input disc 2 and the output disc 3 by the hydraulic pressure of the hydraulic oil, and also adjusts the contacting surface pressure of the troidal surfaces 2a, 3a and the contacting surface 4a by adjusting such sandwiching force.

The hydraulic pressing mechanism 15 includes the sandwiching force generating hydraulic chamber 15a and a sandwiching and pressing force piston 15b. The hydraulic pressing mechanism 15 acts the sandwiching force for sandwiching the power roller 4 between the input disc 2 and the output disc 3 by acting the hydraulic pressure of the hydraulic oil supplied to the sandwiching force generating hydraulic chamber 15a on a front side input disc sandwiching and pressing force acting surface 28 and a rear side input disc sandwiching and pressing force acting surface 29 serving as pressure acting surfaces that rotate with the rotation of the input disc 2.

Specifically, the sandwiching force generating hydraulic chamber 15a is arranged on one side in a direction along the rotation axis line X1 with respect to two input discs 2. The sandwiching force generating hydraulic chamber 15a is arranged on the front side input disc $2_F$ side with respect to the direction along the rotation axis line X1, and is arranged between the input shaft 10 and the front side input disc $2_F$. The sandwiching force generating hydraulic chamber 15a is supplied with the hydraulic oil from the hydraulic control device 9 according to the operation state.

The sandwiching and pressing force piston 15b is formed to a circular plate shape, and is arranged at one end of the variator shaft 11 so that the center substantially matches the rotation axis line X1. The sandwiching and pressing force piston 15b is arranged at an end, that is, the front side (engine 21 side) on the side opposite to the end where the rear side input disc $2_R$ of the variator shaft 11 is arranged. The sandwiching and pressing force piston 15b is arranged between the input shaft 10 and the front side input disc $2_F$ with a spacing from the front side input disc $2_F$ with respect to the direction along the rotation axis line X1. The sandwiching force generating hydraulic chamber 15a described above is arranged between the sandwiching and pressing force piston 15b and the front side input disc $2_F$.

The sandwiching and pressing force piston 15b is rotatable with the rotation axis line X1 as the center with the variator shaft 11 with respect to the variator shaft 11, and is arranged to be movable along the direction along the rotation axis line X1. That is, the sandwiching and pressing force piston 15b is supported by the variator shaft 11 so as to be rotatable with the rotation of the variator shaft 11 and movable with the movement of the variator shaft 11 in the direction along the rotation axis line X1. Furthermore, the sandwiching and pressing force piston 15b does not relatively rotationally displace about the rotation axis line X1 and also does not relatively displace in the direction along the rotation axis line X1 with respect to the variator shaft 11. Therefore, the rear side input disc $2_R$, the variator shaft 11 and the sandwiching and pressing force piston 15b are integrally rotatable with the rotation axis line X1 as the center and movable in the direction along the rotation axis line X1. Furthermore, the front side input disc $2_F$, the rear side input disc $2_R$, the variator shaft 11 and the sandwiching and pressing force piston 15b are integrally rotatable with the rotation axis line X1 as the center, and relatively movable in the direction along the rotation axis line X1 with respect to the rear side input disc $2_R$, the variator shaft 11 and the sandwiching and pressing force piston 15b by the ball spline 11a.

The sandwiching and pressing force piston 15b is also coupled to the input shaft 10, and is arranged to be rotatable with the rotation axis line X1 along with the input shaft 10 and relatively movable in a direction along the rotation axis line X1. Specifically, the sandwiching and pressing force piston 15b is integrally formed with the variator shaft 11, where the sandwiching and pressing force piston 15b and the variator shaft 11 are coupled to the input shaft 10 through a spline engagement portion 11c so as to be able to transmit the drive force. The sandwiching and pressing force piston 15b and the variator shaft 11 are coupled to the input shaft 10 through the spline engagement portion 11c to which a spline formed on the outer circumferential surface of a cylindrical portion 11d along the rotation axis line X1 and a spline formed on an inner circumferential surface of the input shaft 10 along the rotation axis line X1 are spline engaged. The cylindrical portion 11d is the portion arranged projecting out to the front side on the surface on the front side of the sandwiching and pressing force piston 15b, and is the portion formed to a cylindrical shape so that the center axis line thereof substantially matches the rotation axis line X1.

That is, the rear side input disc $2_R$, the variator shaft 11, and the sandwiching and pressing force piston 15b are rotatable with the rotation axis line X1 as the center integrally with the input shaft 10 through the spline engagement portion 11c, and are relatively movable in the direction along the rotation axis line X1 with respect to the input shaft 10. The drive force from the input shaft 10 is transmitted to the variator shaft 11 through the spline engagement portion 11c and the sandwiching and pressing force piston 15b, and transmitted from the variator shaft 11 to the front side input disc $2_F$ and the rear side input disc $2_R$.

The front side input disc $2_F$ includes the front side input disc sandwiching and pressing force acting surface 28, and the sandwiching and pressing force piston 15b include the rear side input disc sandwiching and pressing force acting surface 29. The front side input disc sandwiching and pressing force acting surface 28 is arranged on the rear surface of the troidal surface 2a or the contacting surface with the power roller 4 in the front side input disc $2_F$. The rear side input disc sandwiching and pressing force acting surface 29 is arranged on a surface facing the front side input disc sandwiching and pressing force acting surface 28 in the direction along the rotation axis line X1 in the sandwiching and pressing force piston 15b. The rear side input disc sandwiching and pressing force acting surface 29 is arranged to face the front side input disc sandwiching and pressing force acting surface 28 with the sandwiching force generating hydraulic chamber 15a in between. The sandwiching force generating hydraulic chamber 15a is defined with respect to the direction along the rotation axis line X1 by the front side input disc sandwiching and pressing force acting surface 28 and the rear side input disc sandwiching and pressing force acting surface 29 between the sandwiching and pressing force piston 15b and the front side input disc $2_F$. That is, the front side input disc sandwiching and pressing force acting surface 28 and the rear side input disc sandwiching and pressing force acting surface 29 have the front side input disc sandwiching and pressing force acting surface 28 facing the sandwiching force generating hydraulic chamber 15a on the rear side, and the rear side input disc sandwiching and pressing force acting surface 29 facing the sandwiching force generating hydraulic chamber 15a on the front side.

Therefore, the hydraulic pressing mechanism 15 acts sandwiching and pressing force on the front side input disc sandwiching and pressing force acting surface 28 and the rear side input disc sandwiching and pressing force acting surface 29 by the hydraulic pressure of the hydraulic oil supplied into the sandwiching force generating hydraulic chamber 15a to move the front side input disc $2_F$ in the direction of moving away to the rear side from the hydraulic pressing mechanism 15 and move the rear side input disc $2_R$ in the direction of moving closer to the hydraulic pressing mechanism 15 from the rear side with the variator shaft 11. That is, the front side input disc $2_F$ relatively moves in the direction along the rotation axis line X1 with respect to the variator shaft 11. The hydraulic pressing mechanism 15 moves the front side input disc $2_F$ to the rear side from the hydraulic pressing mechanism 15 side and moves the rear side input disc $2_R$ in the direction of moving closer to the front side with the variator shaft 11, so that the front side input disc $2_F$ is brought close to the front side output disc $3_F$ side, the rear side input disc $2_R$ is brought close to the rear side output disc $3_R$, and the sandwiching force is generated between the front side input disc $2_F$ and the front side output disc $3_F$ and between the rear side input disc $2_R$ and the rear side output disc $3_R$. In this case, a loading nut 11b screw fitted to the rear side end of the variator shaft 11 acts as a reaction force receiver of the sandwiching and pressing force generated by the hydraulic pressing mechanism 15, that is, limits the movement of the rear side input disc $2_R$ to the rear side with respect to the variator shaft 11 by the sandwiching and pressing force. The hydraulic pressing mechanism 15 thus generates the sandwiching force between the front side input disc $2_F$ and the front side output disc $3_F$ and between the rear side input disc $2_R$ and the rear side output disc $3_R$, so that each power roller 4 can be sandwiched between the front side input disc $2_F$ and the front side output disc $3_F$, and between the rear side input disc $2_R$ and the rear side output disc $3_R$ at a predetermined sandwiching force. As a result, the slipping between the input disc 2, the output disc 3 and the power roller 4 can be prevented, and an appropriate traction state can be maintained.

The sandwiching and pressing force by the hydraulic pressing mechanism 15, that is, the sandwiching force is controlled to a predetermined magnitude based on the input torque to the troidal type continuously variable transmission 1 by controlling the amount of hydraulic oil or hydraulic pressure supplied to the sandwiching force generating hydraulic chamber 15a by the hydraulic control device 9, to be described later. That is, the contacting surface pressure acting on the contacting portion of the troidal surfaces 2a, 3a of the input disc 2 and the output disc and the contacting surface 4a of the power roller 4 is controlled to a predetermined magnitude based on the input torque to the troidal type continuously variable transmission 1 by controlling the amount of hydraulic oil or the hydraulic pressure supplied to the sandwiching force generating hydraulic chamber 15a by the hydraulic control device 9. In other words, the troidal type continuously variable transmission 1 has the transmission torque (torque capacity) that can be transmitted between the input disc 2, the output disc 3, and the power roller 4 controlled according to the contacting surface pressure of the troidal surfaces 2a, 3a and the contacting surface 4a. The hydraulic control device 9 is connected to the ECU 60, to be described later. Therefore, the control of the magnitude of the sandwiching and pressing force by the hydraulic pressing mechanism 15, that is, the control of the magnitude of the contacting surface pressure is carried out by the ECU 60.

The transmission ratio changing unit 5 changes the transmission ratio by the pressure, that is, the hydraulic pressure of the hydraulic oil supplied to a transmission shift control hydraulic chamber 82 serving as a transmission shift control pressure chamber. As described above, the transmission ratio changing unit 5 includes the trunnion 6 and the moving portion 7, and changes the transmission ratio by moving the power roller 4 with the trunnion 6 with respect to the rotation axis line X1 of the input disc 2 and the output disc 3 by the moving portion 7, and tilting the power roller 4 with respect to the input disc 2 and the output disc 3. In other words, the transmission ratio changing unit 5 changes the transmission ratio by acting the transmission shift control pressing force on the trunnion 6 supporting the power roller 4 by the hydraulic pressure of the hydraulic oil supplied to the transmission shift control hydraulic chamber 82 to move the power roller 4 from the neutral position to the transmission shift position with respect to the input disc 2 and the output disc 3 along with the trunnion 6 and tilt the power roller 4.

The transmission ratio is the rotation speed ratio, that is, the rotation number ratio of the input disc 2 and the output disc 3, and is typically expressed as [transmission ratio=output side contact radius (contact radius at which power roller 4 and output disc 3 contact (distance between contacting point and rotation axis line X1)/input side contact radius (contact radius at which input disc 2 and power roller 4 contact)].

Specifically, each trunnion 6 supports the power roller 4 in a freely rotating manner, and also moves the power roller 4 with respect to the input disc 2 and the output disc 3 and supports the same in a freely tilting manner with respect to the input disc 2 and the output disc 3. The trunnion 6 includes a roller supporting portion 6a and a rotation shaft 6b serving as a shaft portion.

The roller supporting portion 6a is formed with a space 6c, in which the power roller 4 is arranged, where a recess shaped fit-in portion 6d is formed in the space 6c. The trunnion 6 supports the power roller 4 in a freely rotating manner by inserting the eccentric shaft 42b of the power roller 4 to the fit-in portion 6d, as described above, in the space 6c. The roller supporting portion 6a is arranged to be integrally movable with the rotation shaft 6b. The rotation shaft 6b is formed to project out from a shoulder 6e of the roller supporting portion 6a.

The shoulder 6e of the roller supporting portion 6a is the wall surface arranged to be upright with respect to the wall surface on which the fit-in portion 6d is arranged in the roller supporting portion 6a. The shoulder 6e is arranged as a pair with respect to the wall surface on which the fit-in portion 6d is arranged in the roller supporting portion 6a, and such pair of shoulders 6e are arranged to face each other. The roller supporting portion 6a is formed with a space 6c by facing the pair of shoulders 6e with respect to each other. The roller supporting portion 6a has the wall surface on which the fit-in portion 6d is arranged and the pair of shoulders 6e integrally formed.

The rotation shaft 6b is formed to project out from the pair of shoulders 6e of the roller supporting portion 6a, respectively. Each rotation shaft 6b is formed to a columnar shape, and is rotatably arranged with the coaxial rotation axis line X3 as the center of rotation. The trunnion 6 is supported at the casing 1a through a lower link 16a and an upper link 17a, a cylinder body 86, and the like such that the roller supporting portion 6a is freely rotatable with the rotation axis line X3 as the center of rotation with the rotation shaft 6b. The trunnion 6 is supported at the casing 1a through the lower link 16a and the upper link 17a, the cylinder body 86, and the like such that the roller supporting portion 6a is freely movable in a direction along the rotation axis line X3 with the rotation shaft 6b, and is configured to be movable in the direction along the rotation axis line X3 by the moving portion 7.

The lower link 16a and the upper link 17a will be described in detail later.

A total of four trunnions 6, two for one cavity formed by a pair of input disc 2 and output disc 3, is arranged, each of which supports each of the four power rollers 4. In other words, the troidal type continuously variable transmission 1 includes two trunnions 6 respectively supporting the two power rollers 4 with respect to the front side cavity $C_F$ as a pair and includes two trunnions 6 respectively supporting the two power rollers 4 with respect to the rear side cavity $C_R$ as a pair.

The trunnion 6 supports the power roller 4 such that the rotation axis line X2 of the power roller 4 is parallel to a plane perpendicular to the rotation axis line X3 of the rotation shaft 6b. The trunnion 6 is arranged such that the rotation axis line X3 of the rotation shaft 6b becomes parallel to a plane perpendicular to the rotation axis line X1 of the input disc 2 and the output disc 3. In other words, the trunnion 6 can move the power roller 4 along the rotation axis line X3 with respect to the rotation axis line X1 of the input disc 2 and the output disc 3 by moving along the rotation axis line X3 within a plane perpendicular to the rotation axis line X1. The trunnion 6 rotates with the rotation axis line X3 as the center of rotation so that the power roller 4 can freely tilt with respect to the input disc 2 and the output disc 3 with the rotation axis line X3 as the center within a plan perpendicular to the rotation axis line X3. In other words, the trunnion 6 supports the power roller 4 in a tiltable manner as the tilting force, to be described later, acts on the power roller 4.

The moving portion 7 moves the power roller 4 in the direction along the rotation axis line X3 with the trunnion 6, and includes the hydraulic piston section 8 and the hydraulic control device 9, as described above.

The hydraulic piston section 8 is configured to include a transmission shift control piston 81 serving as a piston and a transmission shift control hydraulic chamber 82, and moves the trunnion 6 in two directions (A1 direction and A2 direction) along the rotation axis line X3 by receiving the hydraulic pressure of the hydraulic oil introduced to the transmission shift control hydraulic chamber 82 with a flange portion 84 of the transmission shift control piston 81. In other words, the hydraulic piston section 8 acts the transmission shift control pressing force on the flange portion 84 arranged in the trunnion 6 by the hydraulic pressure of the hydraulic oil supplied to the transmission shift control hydraulic chamber 82.

Specifically, the transmission shift control piston 81 is configured by a piston base 83 and the flange portion 84. The piston base 83 receives with one end of the rotation shaft 6b formed to a cylindrical shape, and is fixed with respect to the direction of the rotation axis line X3 and around the rotation axis line X3.

The flange portion 84 is arranged in a fixed manner so as to project in the radial direction of the piston base 83, that is, the radial direction of the rotation shaft 6b from the piston base 83, and is movable in the direction along the rotation axis line X3 with the piston base 83 and the rotation shaft 6b of the trunnion 6. The flange portion 84 is formed to a circular ring shape around the rotation axis line X3 of the rotation shaft 6b.

The transmission shift control hydraulic chamber 82 is formed by a hydraulic chamber forming member 85. The hydraulic chamber forming member 85 is configured by the cylinder body 86 serving as a first forming member and a lower cover 87 serving as a second forming member. In other words, the hydraulic chamber forming member 85 forms the wall surface of the transmission shift control hydraulic chamber 82, and is also divided to the cylinder body 86 and the lower cover 87 with respect to the direction along the rotation axis line X3 or the moving direction (stroke direction) of the trunnion 6. The cylinder body 86 is formed with a recess that becomes the space of the transmission shift control hydraulic chamber 82. The lower cover 87 is fixed to the cylinder body 86 to close the opening of the recess of the cylinder body 86, so that the transmission shift control hydraulic chamber 82 is defined to a cylindrical shape (cylinder shape) having the rotation axis line X3 as the center by the cylinder body 86 and the lower cover 87. The cylinder body 86 and the lower cover 87 are fixed to the casing 1a on the side opposite to the lower cover 87 side of the cylinder body 86. A gasket 88 for preventing leakage of the hydraulic oil in the transmission shift control hydraulic chamber 82 to the outside is arranged between the cylinder body 86 and the lower cover 87.

The flange portion 84 is accommodated in the transmission shift control hydraulic chamber 82 to which the hydraulic oil is introduced, and partitions the transmission shift control hydraulic chamber 82 to two hydraulic chambers in the direction along the rotation axis line X3, that is a first hydraulic chamber OP1 and a second hydraulic chamber OP2. The first hydraulic chamber OP1 moves the trunnion 6 in the first direction A1 along the rotation axis line X3 with the flange portion 84 by the hydraulic pressure of the hydraulic oil supplied to the inside, and the second hydraulic chamber OP2 moves the trunnion 6 in the second direction A2, which is the direction opposite to the first direction, with the flange portion 84 by the hydraulic pressure of the hydraulic oil supplied to the inside.

An annular seal member S1 is arranged at the distal end on the outer side of the radial direction of the flange portion 84, so that the first hydraulic chamber OP1 and the second hydraulic chamber OP2 of the transmission shift control hydraulic chamber 82 partitioned by the flange portion 84 are sealed to each other by the seal member S1 so that the hydraulic oil does not leak outside. Annular seal members S2, S3, S4, are arranged with respect to the cylinder body 86 and the lower cover 87 or the hydraulic chamber forming member 85 forming the transmission shift control hydraulic chamber 82 at the outer peripheral part of the piston base 83, so that the outer peripheral part of the piston base 83 and the cylinder body 86, the lower cover 87 are sealed by the seal members S2, S3, S4 so that the hydraulic oil in the transmission shift control hydraulic chamber 82 does not leak outside.

Since two power rollers 4 and two trunnions 6 are arranged for each pair of input disc 2 and output disc 3, two first hydraulic chambers OP1 and two second hydraulic chambers OP2 are arranged for each pair of input disc 2 and output disc 3. In the pair of trunnions 6, the position relationship of the first hydraulic chamber OP1 and the second hydraulic chamber OP2 are interchanged for each trunnion 6. That is, the hydraulic chamber acting as the first hydraulic chamber OP1 of one trunnion 6 becomes the second hydraulic chamber OP2 of the other trunnion 6, and the hydraulic chamber acting as the second hydraulic chamber OP2 of one trunnion 6 becomes the first hydraulic chamber OP1 of the other trunnion 6. Therefore, in the troidal type continuously variable transmission 1 illustrated in FIG. 2, the two power rollers 4 arranged for each pair of input disc 2 and output disc 3 move in opposite directions to each other along the rotation axis line X3 by the hydraulic pressure of the first hydraulic chamber OP1 or the second hydraulic chamber OP2.

The hydraulic control device 9 supplies the hydraulic oil to each unit of the transmission such as the transmission shift control hydraulic chamber 82 of the hydraulic piston section 8, the sandwiching force generating hydraulic chamber 15a of the hydraulic pressing mechanism 15, the torque converter 22 and the forward/backward movement switching mechanism 23. The hydraulic control device 9 controls the amount or the hydraulic pressure of the hydraulic oil to be supplied to at least the sandwiching force generating hydraulic chamber 15a and the transmission shift control hydraulic chamber 82.

The hydraulic control device 9 takes in, pressurizes and discharges the hydraulic oil stored in an oil pan 91 (see FIG. 1) and supplied to each unit of the transmission with a pump device 92 (see FIG. 1) serving as a pump means, to be described later. The pump device 92 is driven in cooperation with the rotation of the crankshaft 21a, which is the output shaft of the engine 21 that generates the drive force, and takes in, pressurizes and discharges the hydraulic oil stored in the oil pan 91.

The hydraulic control device 9 has the hydraulic oil pressurized by the pump device 92 supplied to various flow rate control valves and the like through the pressure regulator valve. The various flow rate control valves are configured to include a spool valve member, an electromagnetic solenoid, and the like, and includes a flow rate control valve for controlling the supply of hydraulic oil to the first hydraulic chamber OP1 and the second hydraulic chamber OP2 or the discharge of hydraulic oil from the first hydraulic chamber OP1 and the second hydraulic chamber OP2, and a flow rate control valve for controlling the supply of hydraulic oil to the sandwiching force generating hydraulic chamber 15a or the discharge of hydraulic oil from the sandwiching force generating hydraulic chamber 15a. The flow rate control valve of the hydraulic control device 9 controls the flow rate or the hydraulic pressure of the hydraulic oil to be supplied to or discharged from the first hydraulic chamber OP1, the second hydraulic chamber OP2, and the sandwiching force generating hydraulic chamber 15a by having the electromagnetic solenoid driven by the drive current based on a control command value input that is input from the ECU 60 displace the position of the spool valve member. The pressure regulator valve returns the hydraulic oil on the downstream side to the oil pan 91 to adjust the pressure to a predetermined line pressure when the hydraulic pressure on the downstream side of the pressure regulator valve becomes greater than or equal to a predetermined hydraulic pressure, that is, greater than or equal to a line pressure used as the original pressure of the hydraulic control device 9.

The hydraulic control device 9 will be specifically described later.

For instance, the ECU 60 controls the flow rate control valve of the hydraulic control device 9, supplies the hydraulic oil pressurized by the pump device 92 to the first hydraulic chamber OP1, and discharges the hydraulic oil in the second hydraulic chamber OP2, so that the hydraulic pressure of the first hydraulic chamber OP1 acts on the flange portion 84 to realize "hydraulic pressure of first hydraulic chamber OP1>hydraulic pressure of second hydraulic chamber OP2". The flange portion 84 of the hydraulic piston section 8 is thus pushed in the first direction A1 along the rotation axis line X3, and the power roller 4 moves in the first direction A1 along the rotation axis line X3 with the trunnion 6. Similarly, the ECU 60 controls the flow rate control valve of the hydraulic control device 9, discharges the hydraulic oil pressurized by the pump device 92 from the first hydraulic chamber OP1, and supplies the hydraulic oil to the second hydraulic chamber OP2, so that the hydraulic pressure of the second hydraulic chamber OP2 acts on the flange portion 84 to realize "hydraulic pressure of first hydraulic chamber OP1<hydraulic pressure of second hydraulic chamber OP2". The flange portion 84 of the hydraulic piston section 8 is thus pushed in the second direction A2 along the rotation axis line X3, and the power roller 4 moves in the second direction A2 along the rotation axis line X3 with the trunnion 6. In this case, the movement of the power roller 4 in the first direction A1 or the second direction A2 is adjusted according to the movement amount of the spool valve member of the flow rate control valve.

Therefore, the moving portion 7 acts a predetermined transmission shift control pressing force on the flange portion 84 of the transmission shift control piston 81 to move the power roller 4 in two directions along the rotation axis line X3, that is, the first direction A1 and the second direction A2 by having the hydraulic control device 9 driven by the ECU 60 and the hydraulic pressure in each transmission shift control hydraulic chamber 82 of the hydraulic piston section 8 controlled. In this case, the pair of trunnions 6 and the pair of power rollers 4 arranged for every pair of input disc 2 and output disc 3 are moved in opposite directions to each other along the rotation axis line X3. The transmission ratio changing unit 5 moves the pair of power rollers 4 in opposite directions to each other to the transmission shift position (see FIG. 6) corresponding to the transmission ratio from the neutral position (see FIG. 5) with respect to the input disc 2 and the output disc 3 with the pair of trunnions 6 by the moving portion 7, and tilts the power roller 4 with respect to the input disc 2 and the output disc 3 to change the transmission ratio.

As illustrated in FIG. 5, the neutral position of the power roller 4 with respect to the input disc 2 and the output disc 3 is the position where the transmission ratio is fixed, and is the position where the tilting force for titling the power roller 4 with respect to the input disc 2 and the output disc 3 does not act on the power roller 4. In other words, when the power roller 4 is at the neutral position and the transmission ratio is fixed, the rotation axis line X2 of the power roller 4 is set in a plane including the rotation axis line X1, the plane being perpendicular to the rotation axis line X3. In other words, the position of the power roller 4 in the direction along the rotation axis line X3 is set to the position where the rotation axis line X2 of the power roller 4 passes (is orthogonal to) the rotation axis line X1 at the neutral position of the power roller 4 (time of fixing transmission ratio). In this case, the rotation direction (rolling direction) of the power roller 4 and the rotation direction of the input disc 2, the output disc 3 match at the contacting point of the power roller 4 and the input disc 2, the output disc 3, and as a result, the tilting force does not act on the power roller 4, and hence the power roller 4 continues to rotate with the input disc 2 while remaining at the neutral position with the transmission ratio fixed during such time.

In this case, the hydraulic piston section 8 and the hydraulic control device 9 of the moving portion 7 act the force of simply going against the drive force on the trunnion 6 by the hydraulic pressure since the force acting on the power roller 4 from the input disc 2 is basically only the drive force (torque). In other words, if the power roller 4 and the trunnion 6 supporting the same are at the neutral position, the transmission shift control pressing force F2 (see FIG. 5) having a magnitude of going against the tangent force F1 (see FIG. 5) acting on the contacting point of the input disc 2, the output disc 3 and the power roller 4 according to the input torque is acted on the flange portion 84, and the tangent force F1 acting on the power roller 4 and the transmission shift control pressing force F2 are balanced, so that the positions of the power roller 4 and the trunnion 6 supporting the same are fixed at the neutral position and the transmission ratio is fixed.

As illustrated in FIG. 6, the transmission shift position of the power roller 4 is the position where the transmission ratio is changed, and is the position where the tilting force for tilting the power roller 4 with respect to the input disc 2 and the output disc 3 acts on the power roller 4. In other words, when the power roller 4 is at the transmission shift position and the transmission ratio is changed, the rotation axis line X2 of the power roller 4 is set to a position moved in the first direction A1 or the second direction A2 along the rotation axis line X3 from a plane including the rotation axis line X1, the plane being perpendicular to the rotation axis line X3. In other words, the position of the power roller 4 in the direction along the rotation axis line X3 is set to the position where the rotation axis line X2 of the power roller 4 passes the rotation axis line X1, that is, the position offset from the neutral position at the transmission shift position (time of transmission shift) of the power roller 4. In this case, the rotation direction of the power roller 4 and the rotation direction of the input disc 2, the output disc 3 are shifted at the contacting point of the power roller 4, and the input disc 2, the output disc 3, and hence the tilting force acts on the power roller 4. Consequently, a side slip occurs between the power roller 4 and the input disc 2 and the output disc 3 by the tilting force acting on the power roller 4, so that the power roller 4 is tilted with respect to the input disc 2 and the output disc 3, and the input side contact radius of the power roller 4 and the input disc 2 and the output side contact radius of the power roller 4 and the output disc 3 are changed thus changing the transmission ratio.

For instance, as illustrated in FIG. 6, the power roller 4 is offset in the second direction A2 (direction opposite to the moving direction of the input disc 2 at the contacting point of the power roller 4 and the input disc 2, that is, direction opposite to the rotation direction of the input disc 2 (direction along rotation direction of the output disc 3)) along the rotation axis line X3 with the input disc 2 rotating in the direction of the arrow B (counterclockwise direction) in FIG. 6. At the contacting point of the power roller 4 and the input disc 2, the circumferential force of the input disc 2 acts on the power roller 4 and the tilting force in the direction of moving the power roller 4 towards the peripheral side of the input disc 2 (direction of moving the power roller 4 away from the rotation axis line X1 of the input disc 2) acts. As a result, the power roller 4 is tilted so that the contacting point with the input disc 2 moves radially outward of the input disc 2 and so that the contacting point with the output disc 3 moves radially inward of the output disc 3, the transmission ratio is changed to the reducing side and up shifted. The power roller 4 is again returned to the neutral position to fix the changed transmission ratio.

In down shifting, the power roller 4 is offset in the first direction A1 (moving direction of the input disc 2 at the contacting point of the power roller 4 and the input disc 2, that is, direction along the rotation direction of the input disc 2 (direction opposite to rotation direction of the output disc 3)) along the rotation axis line X3. At the contacting point of the power roller 4 and the input disc 2, the circumferential direction of the input disc 2 acts on the power roller 4 and the tilting force in the direction (direction of approaching the power roller 4 to the rotation axis line X1 of the input disc 2) of moving the power roller 4 towards the center of the input disc 2 acts. As a result, the power roller 4 is tilted so that the contacting point with the input disc 2 moves radially inward of the input disc 2 and so that the contacting point with the output disc 3 moves radially outward of the output disc 3, the transmission ratio is changed to the increasing side and down shifted. The power roller 4 is again returned to the neutral position to fix the changed transmission ratio.

The position of the power roller 4 is determined by the stroke amount and the tilt angle with respect to the input disc 2 and the output disc 3. The stroke amount of the power roller 4 is the stroke amount serving as the movement amount from the neutral position in the first direction A1 or the second direction A2, and furthermore, the amount corresponding to the stroke amount (offset amount) from the neutral position, the neutral position where the rotation axis line X2 of the power roller 4 passing the rotation axis line X1 of the input disc 2 and the output disc 3 being the reference position. The tilt angle of the power roller 4 is the inclination angle (inclination angle to acute angle side) with respect to the input disc 2 and the output disc 3 from the reference position, that is, the rotation angle about the rotation axis line X3, the reference position being the position where the rotation axis line X2 or the center of rotation of the power roller 4 is orthogonal to the rotation axis line X1 or the center of rotation of the input disc 2 and the output disc 3. The transmission ratio of the troidal type continuously variable transmission 1 is defined by the tilt angle with respect to the input disc 2 and the output disc 3 of the power roller 4, which tilt angle is defined by the integral value of the stroke amount (offset amount) from the neutral position of the power roller 4.

The troidal type continuously variable transmission 1 includes a lower link mechanism 16 and an upper link mechanism 17 for a mechanism for synchronizing the movement in opposite directions along the rotation axis line X3 of the pair of power rollers 4 and trunnions 6 arranged for every pair of input disc 2 and output disc 3.

The lower link mechanism 16 includes a lower link 16a serving as a link member and the upper link mechanism 17 includes an upper link 17a serving as a link member. The lower link 16a couples the pair of trunnions 6 through a bearing (radial bearing) 6f, which is a spherical bearing, at one end side (between cylinder body 86 and one shoulder 6e of roller supporting portion 6a) where the transmission shift control piston 81 is arranged in the rotation shaft 6b of the trunnion 6. The upper link 17a couples the pair of trunnions 6 through a bearing (radial bearing) 6f, which is a spherical bearing, at the other end side (other shoulder 6e side of roller supporting portion 6a) in the rotation shaft 6b of the trunnion 6.

The lower link 16a and the upper link 17a are respectively supported by a lower supporting shaft 16c of a lower post 16b fixed to the casing 1a and an upper supporting shaft 17c of an upper post 17b fixed to the casing 1a through the cylinder body 86. The lower supporting shaft 16c and the upper supporting shaft 17c are both formed to a columnar shape, and are fixedly arranged so as not to relatively move with respect to the casing 1a such that the center axis line is in a direction parallel to the rotation axis line X1. The lower link 16a and the upper link 17a are supported by the lower supporting shaft 16c and the upper supporting shaft 17c, respectively, so as to oscillate in a see-saw form with the lower supporting shaft 16c and the upper supporting shaft 17c as the supporting point, that is, the center axis line of the lower supporting shaft 16c and the upper supporting shaft 17c as an oscillation axis line X4.

Therefore, the lower link mechanism 16 and the upper link mechanism 17 can synchronize the movement in opposite directions along the rotation axis line X3 of the pair of trunnions 6 by oscillating the lower link 16a and the upper link 17a with the oscillation axis line X4, which is the center axis line of the lower supporting shaft 16c and the upper supporting shaft 17c, as the center. A nozzle 17d is attached to the upper post 17b, and an injection hole 17e is formed in the nozzle 17d, so that the hydraulic oil is injected from the injection hole 17e as the traction oil, described above.

The troidal type continuously variable transmission 1 includes a synchronization mechanism 18 as a mechanism for advancing the synchronization of the rotation with the rotation axis line X3 of a plurality of trunnions 6 as the center of rotation. The synchronization mechanism 18 includes a synchronization wire 19 and a plurality of fixed pulleys 20. The synchronization mechanism 18 transmits the rotation torque of one trunnion 6 to the other trunnion 6 by the friction force of the fixed pulley 20 arranged fixed to the rotation shaft 6b of each trunnion 6 and the synchronization wire 19 inverted and bridged so as to cross once between the adjacent fixed pulleys 20 in the rotation axis line X1 direction or the rotation axis line X2 direction, thus advancing the synchronization of the rotation having the rotation axis line X3 of the plurality of trunnions 6 as the center of rotation.

As a result, in the tilting operation (transmission shift operation) of each power roller 4 and each trunnion 6, the synchronization mechanism 18 can synchronize the rotation of the plurality of trunnions 6 in cooperation with each other to mutually synchronize the tilting operation of a plurality of power rollers 4 even if the sandwiching force of the hydraulic pressing mechanism 15 is not evenly acting on the plurality of power rollers 4 due to the variation in the member accuracy or the assembly accuracy of the trunnion 6, which is the supporting structure of the plurality of power rollers 4, or even if a microscopic shift may occur in the transmission shift responsiveness due to the difference in oil passage resistance of the hydraulic control device 9, or the like, and hence the transmission shift control accuracy of the troidal type continuously variable transmission 1 can be enhanced.

The ECU 60 controls the drive of the troidal type continuously variable transmission 1, and in particular, controls the transmission ratio γ, and carries out an operation control of the engine 21 such as the injection control of a fuel injection valve (not illustrated), the throttle opening control of the throttle valve (not illustrated) for controlling the intake air amount of the engine 21, and the ignition control of the ignition plug based on various input signals and various maps input from the sensor attached to each area of the vehicle 1A on which the engine 21 is loaded. The ECU 60 controls the drive of each unit of the troidal type continuously variable transmission 1 according to the operation state of the troidal type continuously variable transmission 1 to control the actual transmission ratio, which is the actual transmission ratio of the troidal type continuously variable transmission 1. In other words, on the basis of the engine rotation number, the throttle opening, the accelerator opening, the input rotation number, the output rotation number, the operation state such as the shift position, the tilt angle, and the stroke amount detected by various sensors, the ECU 60 determines a target transmission ratio, which is a target transmission ratio and drives the transmission ratio changing unit 5 to move the power roller 4 from the neutral position towards the transmission shift position up to a predetermined stroke amount and tilts the power roller 4 up to a predetermined tilt angle to change the transmission ratio. Furthermore, the ECU 60 duty controls the drive current to supply to the flow rate control valve of the hydraulic control device 9 based on the control command value to control the hydraulic pressure of the first hydraulic chamber OP1 and the second hydraulic chamber OP2 of the hydraulic piston section 8 and move the power roller 4 from the neutral position towards the transmission shift position up to a predetermined stroke amount and tilts the power roller 4 up to a predetermined tilt angle with the trunnion 6 so that the actual transmission ratio becomes the target transmission ratio.

Specifically, the ECU 60 is electrically connected with various sensors such as a tilt angle sensor 50, a stroke sensor 51, an engine rotation number sensor 52, an input rotation number sensor 53, an output rotation number sensor 54, an accelerator opening sensor 55, a vehicle speed sensor 56, a throttle opening sensor 57, a hydraulic oil temperature sensor 58, and a line pressure sensor 59. The ECU 60 functionally and conceptually includes a torque converter controller 61, a forward/backward movement switching controller 62, a sandwiching force controller 63, an engine controller 64, and a transmission ratio controller 65.

The ECU 60 is configured centering on the micro-computer, and includes a processing unit 60a, a storage unit 60b, and an input/output unit 60c, which are connected to each other to be able to exchange signals with each other. A drive circuit (not illustrated) for driving each unit of the vehicle 1A including the troidal type continuously variable transmission 1 and the various types of sensors described above are connected to the input/output unit 60c, and the input/output unit 60c carries out input/output of signals with the sensors and the like. The storage unit 60b stores a computer program for controlling each unit of the troidal type continuously variable transmission 1. The storage unit 60b may be configured by a hard disc device or a magneto optical magnetic disc device, non-volatile memory such as flash memory (read-only storage medium such as CD-ROM), volatile memory such as RAM (Random Access Memory), or a combination thereof. The processing unit 60a is configured by memory (not illustrated) and a CPU (Central Processing Unit), and includes at least the torque converter controller 61, the forward/backward movement switching controller 62, the sandwiching force controller 63, the engine controller 64, and the transmission ratio controller 65 described above. Various controls by the ECU 60 are executed by having the processing unit 60a read the program into the memory incorporated in the processing unit 60a and perform the calculation based on the detection result of the sensor arranged in each unit, and transmit a control signal according to the result of the calculation. In this case, the processing unit 60a appropriately stores the numerical value in the middle of the calculation to the storage unit 60b, and also retrieves the stored numerical value to execute the calculation. When controlling each unit of the troidal type continuously variable transmission 1, control may be carried out by a dedicated hardware different from the ECU 60 in place of the computer program.

The tilt angle sensor 50 detects the tilt angle with respect to the input disc 2 and the output disc 3 of the power roller 4, and transmits the detected tilt angle to the ECU 60. The tilt angle sensor 50 is arranged in plurals in correspondence with a plurality of power rollers 4 to detect the tilt angle of each power roller. The tilt angle detected by the tilt angle sensor 50 is detected as a rotation angle about the rotation axis line X3 of the trunnion 6 that rotates about the rotation axis line X3 with the power roller 4.

The stroke sensor 51 detects the stroke amount of the power roller 4, and transmits the detected stroke amount to the ECU 60. The stroke sensor 51 is arranged in plurals in correspondence with a plurality of power rollers 4 to detect the stroke amount of each power roller 4. The stroke amount of the power roller 4 detected by the stroke sensor 51 is detected as the stroke amount of the trunnion 6 that moves in the direction along the rotation axis line X3 with the power roller 4.

The engine rotation number sensor 52 detects the engine rotation number as the rotation speed of the engine 21, which is the drive source, and transmits the detected engine rotation number to the ECU 60. The engine rotation number sensor 52 can use a crank angle sensor for detecting the crank angle of the engine, where the ECU 60 distinguishes the intake stroke, the compression stroke, the expansion stroke, and the exhaust stroke in each cylinder based on the detected crank angle and also calculates the engine rotation number (rpm) as the rotation speed of the engine. The engine rotation number corresponds to the rotation speed of the crankshaft 21a, where the rotation number of the crankshaft 21a and the engine rotation number become higher as the rotation speed of the crankshaft 21a becomes higher. The rotation speed will be hereinafter described as the rotation number unless particularly stated otherwise.

The input rotation number sensor 53 detects the input rotation number or the rotation number and the rotation direction of the input disc 2, and transmits the detected input rotation number and rotation direction to the ECU 60. The output rotation number sensor 54 detects the output rotation number or the rotation number and the rotation direction of the output disc 3, and transmits the detected output rotation number and rotation direction to the ECU 60. The input rotation number sensor 53 and the output rotation number sensor 54 may respectively detect based on the rotation number of the member that rotates at the rotation number (rotation speed) proportional to the rotation number (rotation speed) of the input disc 2 and the output disc 3. In other words, the input rotation number and the output rotation number correspond to the rotation speeds of the input disc 2 and the output disc 3, respectively.

The accelerator opening sensor 55 detects the accelerator opening of the vehicle 1A, on which the troidal type continuously variable transmission 1 is loaded, and transmits the detected accelerator opening to the ECU 60. The vehicle speed sensor 56 detects the vehicle speed of the vehicle 1A, on which the troidal type continuously variable transmission 1 is loaded, and transmits the detected vehicle speed to the ECU 60. The throttle opening sensor 57 detects the throttle opening of the vehicle 1A, on which the troidal type continuously variable transmission 1 is loaded, and transmits the detected throttle opening to the ECU 60.

The hydraulic oil temperature sensor 58 detects the temperature of the hydraulic oil to be applied on the troidal type continuously variable transmission 1, and transmits the detected hydraulic oil temperature to the ECU 60. The line pressure sensor 59 detects the line pressure used as the original pressure of the hydraulic control device 9, and transmits the detected line pressure to the ECU 60.

The torque converter controller 61 controls the lockup clutch of the torque converter 22. The torque converter controller 61 controls the hydraulic control device 9 to engage and disengage, that is, perform the ON/OFF control of the lockup clutch of the torque converter 22.

The forward/backward movement switching controller 62 controls the forward/backward movement switching mechanism 23. The forward/backward movement switching controller 62 controls the hydraulic control device 9 to engage and disengage, that is, perform the ON/OFF control of the forward clutch and the reverse brake of the forward/backward movement switching mechanism 23, thus carrying out the switching control of the forward/backward movement switching mechanism 23.

The sandwiching force controller 63 controls the hydraulic pressing mechanism 15 for acting the sandwiching force for sandwiching the power roller 4 between the input disc 2 and the output disc 3. In other words, the sandwiching force controller 63 controls the contacting surface pressure that acts on the contacting portion of the troidal surfaces 2a, 3a of the input disc 2 and the output disc 3, and the contacting surface 4a of the power roller 4. The sandwiching force controller 63 controls the hydraulic control device 9 and controls the amount of hydraulic oil to be supplied to the sandwiching force generating hydraulic chamber 15a to control the sandwiching force by the hydraulic pressing mechanism 15 to a predetermined target sandwiching force based on the input torque to the troidal type continuously variable transmission 1, and controls the contacting surface pressure acting on the contacting portion of the troidal surfaces 2a, 3a of the input disc 2 and the output disc 3 and the contacting surface 4a of the power roller 4 to a predetermined surface pressure based on the input torque to the troidal type continuously variable transmission 1.

The engine controller 64 operation controls the engine 21. The engine controller 64 controls the injector, the ignition plug, and the electronic throttle valve to control the output retrieved from the engine 21, and carries out the control of the engine torque serving as the output torque of the engine 21 and the engine rotation number.

The transmission ratio controller 65 controls the transmission ratio changing unit 5 such that the actual transmission ratio, which is the actual transmission ratio, becomes the target transmission ratio, which is the target transmission ratio. In other words, the transmission ratio controller 65 controls the transmission ratio changing unit 5 to control the actual transmission ratio such that the actual input rotation number to the input disc 2 becomes the target input rotation number corresponding to the target transmission ratio. In other words, on the basis of the engine rotation number, the throttle opening, the accelerator opening, the engine rotation number, the input rotation number, the output rotation number, the operation state such as the shift position, the tilt angle, and the stroke amount, the transmission ratio controller 65 determines the target transmission ratio, which is a target transmission ratio and drives the transmission ratio changing unit 5 to move the power roller 4 from the neutral position towards the transmission shift position up to a predetermined stroke amount and tilts the power roller 4 up to a predetermined tilt angle to change the transmission ratio.

In the troidal type continuously variable transmission 1 described above, when the drive force (torque) is input to the input disc 2, the drive force is transmitted to the power roller 4 brought into contact with the input disc 2 through the traction oil, and the drive force is further transmitted from the power roller to the output disc 3 through the traction oil. In the meantime, glass transition is observed in the traction oil by being pressurized, and the drive force is transmitted by the large shearing force involved therewith, and hence each input disc 2 and output disc 3 is pushed by the hydraulic pressing mechanism 15 such that the sandwiching force corresponding to the input torque is generated with the power roller 4. Since the peripheral speed of the power roller 4 and the peripheral speed of the torque transmitting point (contacting point where power roller 4 is brought into contact through traction oil) of each input disc 2, output disc 3 are substantially the same, the rotation number (rotation speed) of each input disc 2, output disc 3 differs according to the radius from the rotation axis line X1 of the contacting point of the input disc 2 and the power roller 4 and the radius from then rotation axis line X1 of the contacting point of the power roller 4 and the output disc 3, where the ratio of the rotation number (rotation speed) becomes the transmission ratio.

When changing the transmission ratio to the set target transmission ratio, that is, in the transmission shift of the transmission ratio, the transmission ratio controller 65 of the ECU 60 supplies the drive current to the flow rate control valve of the hydraulic control device 9 based on the rotation direction of the input disc 2 (or output disc 3), and controls the hydraulic pressure of the first hydraulic chamber OP1 and the second hydraulic chamber OP2 to move the trunnion 6 in the first direction A1 or the second direction A2 from the neutral position until the power roller 4 reaches the tilt angle corresponding to the target transmission ratio. For instance, when the power roller 4 is moved in the first direction A1 along the rotation axis line X3 from the neutral position by the hydraulic pressure of the first hydraulic chamber OP1 in a state the input disc 2 is rotating in the direction of the arrow B (counterclockwise direction) in FIG. 4, the transmission ratio increases and the down shift is carried out. When the power roller 4 is moved in the second direction A2 along the rotation axis line X3 from the neutral position by the hydraulic pressure of the second hydraulic chamber OP2 in a state the input disc 2 is rotating in the direction of the arrow B (counterclockwise direction) in FIG. 4, the transmission ratio decreases and the up shift is carried out. When fixing the set transmission ratio, the trunnion 6 is moved in the first direction A1 or the second direction A2 until the power roller 4 is again at the neutral position.

The transmission ratio controller 65 of the ECU 60 performs the cascade type feedback control such that the actual transmission ratio (actual transmission ratio) becomes the target transmission ratio (target transmission ratio after transmission shift) based on the tilt amount of the power roller 4 detected by the tilt angle sensor 50 and the stroke amount detected by the stroke sensor 51. In other words, the ECU 60 determines the target tilt angle, which is the target tilt angle corresponding to the target transmission ratio, based on the accelerator opening and the vehicle speed, determines the target stroke amount, which is the target stroke amount corresponding to the target transmission ratio and the target tilt angle, based on the deviation of the target tilt angle and the actual tilt angle, which is the actual tilt angle detected by the tilt angle sensor, and controls the hydraulic control device 9 of the moving portion 7 such that the stroke amount detected by the stroke sensor becomes the target stroke amount.

In other words, the transmission ratio controller 65 of the ECU 60 determines the target transmission ratio, which is the target transmission ratio, from the accelerator opening, the vehicle speed, and the like. Here, the request drive force is calculated based on the request drive amount represented by the accelerator opening or the like and the vehicle speed, the target output is obtained from the request drive force and the vehicle speed, the rotation number of the engine at which the target output is achieved with minimum fuel consumption is obtained, and the target transmission ratio is obtained such that the input rotation number to the troidal type continuously variable transmission 1 becomes the target rotation number corresponding to the rotation number of the engine, that is, the target input rotation number. The relationship of the transmission ratio and the tilt angle is defined solely by the geometrical shape if the contacting point of the power roller 4 and the input disc 2 and the output disc 3 is known, and hence the target tilt angle can be obtained from the target transmission ratio.

The transmission shift control of the troidal type continuously variable transmission 1, only the tilt angle (i.e., transmission ratio) detected by the tilt angle sensor is basically to be feedback controlled, but the damping effect of suppressing the vibration in the tilt control can be obtained by also performing the feedback control of the stroke amount detected by the stroke sensor since the stroke amount corresponds to the differentiation of the tilt angle. The transmission ratio controller 65 of the ECU 60 may also perform the feed forward control along with the feedback control to enhance the responsiveness of the transmission ratio.

As described above, the hydraulic control device 9 of the troidal type continuously variable transmission 1 of the present embodiment includes the pump device 92. As illustrated in FIG. 1, the pump device 92 of the present embodiment is a so-called discharge volume variable pump device in which the discharge volume of the hydraulic oil to the control system 90A can be switched in plural stages, as illustrated in FIG. 1.

The control system 90A in the hydraulic control device 9 of the troidal type continuously variable transmission 1 controls the contacting surface pressure of at least the troidal surfaces 2a, 3a of the input disc 2 and the output disc 3, and the contacting surface 4a of the power roller 4, and the transmission ratio or the rotation speed ratio of the input disc 2 and the output disc 3 by the pressure of the hydraulic oil. That is, the control system 90A of the present embodiment is configured to include the transmission ratio changing unit 5 for changing the transmission ratio by the hydraulic pressure of the hydraulic oil supplied to at least the transmission shift control hydraulic chamber 82, and the hydraulic pressing mechanism 15 for changing the contacting surface pressure of the troidal surfaces 2a, 3a and the contacting surface 4a by the hydraulic pressure of the hydraulic oil supplied to the sandwiching force generating hydraulic chamber 15a.

Specifically, the hydraulic control device 9 of the present embodiment includes an oil pan 91, the pump device 92, a strainer 93, a plurality of oil passages 94a, 94b, 94c, 94d, 94e, 94f, 94g, 94h, 94i, an open/close valve 95a, a check valve 95b, and a relief valve 95c.

The oil pan 91 is a storage means for storing the traction oil serving as the hydraulic oil.

The pump device 92 of the present embodiment can switch the discharge volume of the hydraulic oil to the control system 90A in plural stages, or two stages herein. The pump device 92 includes a main pump 96 serving as a first pump, a sub-pump 97 serving as a second pump, and a switching valve 98 serving as a switching means.

The main pump 96 and the sub-pump 97 are driven in synchronization with the rotation of the crankshaft 21a of the engine 21 to discharge the hydraulic oil taken in after boosting. In other words, the main pump 96 and the sub-pump 97 are driven in cooperation with the rotation of the crankshaft 21a of the engine 21 that generates the drive force to be able to pressurize the hydraulic oil. The main pump 96 and the sub-pump 97 have the respective discharge volume set to be substantially the same, or the discharge volume of the main pump 96 is set to be greater than the discharge volume of the sub-pump 97. The main pump 96 and the sub-pump 97 tend to have greater discharge flow rate the higher the rotation number of the crankshaft 21a of the engine 21, that is, the engine rotation number for driving the main pump 96 and the sub-pump 97, and smaller discharge flow rate the lower the engine ration number.

The pump device 92 of the present embodiment is described as using the engine 21 for the drive source, but is not limited thereto, and an electric motor dedicated to the pump device 92 may be used for the drive source or different drive sources may be arranged for the main pump 96 and the sub-pump 97, respectively.

The main pump 96 discharges the hydraulic oil taken in to the control system 90A. The main pump 96 has a first intake oil passage 94a coupled to an intake port of the hydraulic oil, which first intake oil passage 94a is coupled to a second intake oil passage 94c and communicated to the oil pan 91 through the second intake oil passage 94c and the strainer 93. Furthermore, the main pump 96 has a first discharge oil passage 94b coupled to a discharge port of the hydraulic oil, which first discharge oil passage 94b is communicated to the control system 90A or a high pressure system. The main pump 96 takes in the hydraulic oil in the oil pan 91 through the strainer 93, the second intake oil passage 94c, and the first intake oil passage 94a, and discharges the hydraulic oil taken in to the first discharge oil passage 94b after boosting.

The strainer 93 removes foreign substances from the hydraulic oil taken into the first intake oil passage 94a and the second intake oil passage 94c when the main pump 96 and the sub-pump 97, to be described later, of the pump device 92 take in the hydraulic oil in the oil pan 91 through the second intake oil passage 94c, to be described later.

The sub-pump 97 discharges the hydraulic oil taken in to the control system 90A or a lubricating system 90B serving as a supply system different from the control system 90A. The sub-pump 97 has a second intake oil passage 94c coupled to an intake port of the hydraulic oil, which second intake oil passage 94c is communicated to the oil pan 91 through the strainer 93. The sub-pump 97 has a second discharge oil passage 94d coupled to the discharge port of the hydraulic oil, which second discharge oil passage 94d is coupled to a control system discharge oil passage 94e and a lubricating system discharge passage 94f through the switching valve 98. The control system discharge oil passage 94e is coupled to the first discharge oil passage 94b and communicated to the control system 90A or the high pressure system through the first discharge oil passage 94b. The lubricating system discharge passage 94f is communicated to the lubricating system 90B, which is a low pressure system. The sub-pump 97 takes in the hydraulic oil in the oil pan 91 through the strainer 93 and the second intake oil passage 94c, and discharges the hydraulic oil taken in to the control system discharge oil passage 94e or the lubricating system discharge passage 94f through the second discharge oil passage 94d after boosting.

The switching valve 98 is configured to include an electromagnetic valve, and can switch the connecting destination of the second discharge oil passage 94d between the control system discharge oil passage 94e and the lubricating system discharge passage 94f. In other words, the switching valve 98 can switch the discharging destination of the hydraulic oil in the sub-pump 97 between the control system 90A and the lubricating system 90B.

The switching valve 98 is connected to the ECU 60, and the drive is controlled by the ECU 60. The switching valve 98 is configured by an electromagnetic valve that becomes a state of connecting the second discharge oil passage 94d and the control system discharge oil passage 94e at the time of current flow (ON control) of a solenoid 98a and a state of connecting the second discharge oil passage 94d and the lubricating system discharge passage 94f at the time of no-current flow (OFF control) of the solenoid 98a. The switching valve 98 is configured to include an elastic member 98b with the solenoid 98a. The switching valve 98 becomes the ON state (state of ON portion illustrated in FIG. 1), that is, the state in which the second discharge oil passage 94d and the control system discharge oil passage 94e are connected when the pressing force by the solenoid 98a acting on the spool valve member (not illustrated) becomes greater than the bias force by the elastic member 98b acting on the spool valve member thus moving the spool valve member to the ON position if the drive current supplied to the solenoid 98a is set to a predetermined amount. The switching valve 98 becomes the OFF state (state of OFF portion illustrated in FIG. 1), that is, the state in which the second discharge oil passage 94d and the lubricating system discharge passage 94f are connected when the pressing force by the solenoid 98a acting on the spool valve member (not illustrated) becomes smaller than the bias force by the elastic member 98b acting on the spool valve member thus moving the spool valve member to the OFF position if the drive current supplied to the solenoid 98a is set to 0 A. The switching valve 98 is not limited to such format, and may be configured to realize a state in which the second discharge oil passage 94d and the control system discharge oil passage 94e are connected by acting the control hydraulic pressure to the ON position side on the spool valve member based on the line pressure, and moving the spool valve member to the ON position when the pressing force by the control hydraulic pressure becomes greater than the bias force by the elastic member 98b acting on the spool valve member.

The control system 90A is a so-called supply destination of the line pressure, and is configured to include the transmission ratio changing unit 5 and the hydraulic pressing mechanism 15. That is, the hydraulic control device 9 includes a flow rate control valve (not illustrated) for adjusting the flow rate of the hydraulic oil to the transmission shift control hydraulic chamber 82 in the transmission ratio changing unit 5, a flow rate control valve (not illustrated) for adjusting the flow rate of the hydraulic oil to the sandwiching force generating hydraulic chamber 15a in the hydraulic pressing mechanism 15, and the like at the line pressure supply system to the control system 90A. The lubricating system 90B is a so-called supply destination of the lubricating oil, and is configured to include a variator shaft 11 and a slidably moving portion of the troidal type continuously variable transmission 1 such as the contacting portion of the troidal surfaces 2a, 3a and the contacting surface 4a. That is, the hydraulic control device 9 includes a nozzle 17d (see FIG. 4) for supplying the hydraulic oil as the lubricating oil to the variator shaft 11 and the contacting portion of the troidal surfaces 2a, 3a and the contacting surface 4a at the lubricating oil supply system to the lubricating system 90B. In the control system 90A and the lubricating system 90B, the control system 90A is relatively a high pressure system, and the lubricating system 90B is relatively a low pressure system. In other words, the control system 90A and the lubricating system 90B basically have the pressure of the hydraulic oil of the line pressure supply system to the control system 90A set to a pressure relatively greater than the pressure of the hydraulic oil of the lubricating oil supply system to the lubricating system 90B.

The hydraulic control device 9 includes a supply oil passage 94g for supplying the hydraulic oil from the control system 90A to the lubricating system 90B in accordance with the operation state, and includes an open/close valve 95a on the supply oil passage 94g. The open/close valve 95a is an electromagnetic valve and is connected to the ECU 60, so that the drive is controlled by the ECU 60. The open/close valve 95a closes the supply oil passage 94g and shields the flow of the hydraulic oil in the close valve state, and opens the supply oil passage 94g and enables the flow of the hydraulic oil in the open close state.

The first discharge oil passage 94b and the second discharge oil passage 94d are coupled by a coupling oil passage 94h, and the check valve 95b is arranged on the coupling oil passage 94h. The check valve 95b enables the flow of the hydraulic oil from the second discharge oil passage 94d to the first discharge oil passage 94b by having the second discharge oil passage 94d side at a predetermined hydraulic pressure in the coupling oil passage 94h, and prohibits the flow of the hydraulic oil from the first discharge oil passage 94b to the second discharge oil passage 94d.

The lubricating system discharge passage 94f and the second intake oil passage 94c are coupled by the relief oil passage 94i, and the relief valve 95c is arranged on the relief oil passage 94i. The relief valve 95c returns the redundant hydraulic oil discharged from the sub-pump 97 from the downstream side to the upstream side of the sub-pump 97, that is, from the lubricating system discharge passage 94f side to the second intake oil passage 94c side when the pressure of the hydraulic oil discharged from the sub-pump 97 to the lubricating system discharge passage 94f through the second discharge oil passage 94d becomes greater than or equal to a predetermined pressure set in advance. Therefore, the hydraulic control device 9 has the lubricating system 90B, or the lubricating system discharge passage 94f herein, maintained at a pressure of lower than or equal to a predetermined pressure, which lubricating system 90B is basically maintained at relatively low pressure system compared to the control system 90A.

The pump device 92 configured as above has the switching valve 98 switches the discharging destination of the hydraulic oil in the sub-pump 97 from the lubricating system 90B to the control system 90A to switch the discharge volume of the hydraulic oil to the control system 90A from a relatively small volume to a relatively large volume. In other words, the pump device 92 has the switching valve 98 switches the discharging destination of the hydraulic oil in the sub-pump 97 switched from the lubricating system 90B to the control system 90A to switch the discharge volume of the hydraulic oil to the control system 90A in the entire pump device 92 in two stages, the discharge volume (relatively small volume) by only the main pump 96 of the main pump 96 and the sub-pump 97, and the discharge volume (relatively large volume) by the main pump 96 and the sub-pump 97.

The ECU 60 of the present invention has a switching controller 66 functionally and conceptually arranged in the processing unit 60a. The switching controller 66 performs the switching control of the discharge volume of the hydraulic oil to the control system 90A by the pump device 92 by controlling the drive of the switching valve 98 (e.g., drive current to supply to the solenoid 98a) according to the operation state of the vehicle 1A mounted with the troidal type continuously variable transmission 1 and the engine 21. The switching controller 66 can control the switching destination of the switching valve 98, that is, the connecting destination of the second discharge oil passage 94d according to the vehicle 1A mounted with the troidal type continuously variable transmission 1 and the engine 21. The switching controller 66 can also perform the open/close control of the open/close valve 95a herein.

The switching controller 66 controls the drive of the switching valve 98 when the discharge flow rate of the hydraulic oil to the control system 90A by the main pump 96 is greater than or equal to the necessary flow rate of the hydraulic oil necessary in the control system 90A so that the second discharge oil passage 94d and the lubricating system discharge passage 94f are connected, and the discharging destination of the sub-pump 97 is relatively switched to the lubricating system 90B, which is a low pressure system. In other words, the switching controller 66 controls the drive of the switching valve 98 when the necessary flow rate of the hydraulic oil to the control system 90A can be entirely covered by the discharge flow rate by the main pump 96 so that the second discharge oil passage 94d and the lubricating system discharge passage 94f are connected, and the discharging destination of the sub-pump 97 is relatively switched to the lubricating system 90B, which is a low pressure system. That is, the main pump 96 takes in the hydraulic oil of the oil pan 91 from the intake oil passage 94a, and discharges the same to the first discharge oil passage 94b after pressurization. The sub-pump 97 takes in the oil of the oil pan 91 from the intake oil passage 94c, and discharges the same to the lubricating system discharge passage 94f through the second discharge oil passage 94d after pressurization. Therefore, the hydraulic control device 9 has the hydraulic oil discharged by the main pump 96 supplied to the control system 90A, which is the high pressure system, and the hydraulic oil discharged by the sub-pump 97 supplied to the lubricating system 90B, which is the low pressure system.

The hydraulic control device 9 thus can suppress the work volume of the sub-pump 97 and suppress the drive torque of the sub-pump 97, that is, reduce the pump load (pump drive loss) in the sub-pump 97 compared to when continuing a state in which the discharging destination of the sub-pump 97 is set to the control system 90A or the high pressure system by setting the discharging destination of the sub-pump 97 to the lubricating system 90B or the low pressure system, and hence the fuel consumption can be enhanced as a result. The switching controller 66 opens the open/close valve 95a and closes the supply oil passage 94g so that the flow of the hydraulic oil through the supply oil passage 94g is shielded when the discharging destination of the sub-pump 97 is switched to the lubricating system 90B by the switching valve 98.

The switching controller 66 controls the drive of the switching valve 98 when a great amount of hydraulic oil is necessary in the control system 90A and the necessary flow rate of the hydraulic oil assumed to be necessary in the control system 90A is not satisfied with only the discharge flow rate of the hydraulic oil to the control system 90A by the main pump 96 so that the second discharge oil passage 94d and the control system discharge oil passage 94e are connected, and the discharging destination of the sub-pump 97 is relatively switched to the control system 90A. In other words, the main pump 96 takes in the hydraulic oil of the oil pan 91 from the intake oil passage 94a, and discharges the same to the first discharge oil passage 94b after pressurization. The sub-pump 97 takes in the oil of the oil pan 91 from the intake oil passage 94c, discharges the same to the second discharge oil passage 94d after pressurization, and discharges to the first discharge oil passage 94b through the control system discharge oil passage 94e. Thus, the hydraulic oil discharged by the main pump 96 and the sub-pump 97 are all supplied to the control system 90A, which is the high pressure system.

The hydraulic control device 9 thus can carry out the supply of the hydraulic oil to the control system 90A with the main pump 96 and the sub-pump 97, and hence the lack of actual discharge flow rate of the hydraulic oil to the control system 90A can be suppressed with respect to the necessary flow rate of the hydraulic oil in the control system 90A. The switching controller 66 opens the open/close valve 95a and opens the supply oil passage 94g to allow the flow of the hydraulic oil when the discharging destination of the sub-pump 97 is switched to the control system 90A by the switching valve 98, so that the hydraulic oil of the control system 90A is supplied to the lubricating system 90B through the supply oil passage 94g. The troidal type continuously variable transmission 1 can prevent lack of supply of the hydraulic oil to the lubricating system 90B in the hydraulic control device 9.

As illustrated in FIG. 7, the hydraulic control device 9 configured to include the discharge volume variable pump device 92 basically switches the discharging destination of the sub-pump 97 to the lubricating system 90B or the low pressure system since the discharge flow rate of the main pump 96 is relatively large in a region T1 where the engine rotation number NE of the engine 21 is greater than or equal to a predetermined engine rotation number NE1. In FIG. 7, the horizontal axis indicates the vehicle speed V (Km/h) of the vehicle 1A mounted with the troidal type continuously variable transmission 1, the vertical axis indicates the engine rotation number NE (rpm) of the engine 21 of the vehicle 1A mounted with the troidal type continuously variable transmission 1, γmax indicates the transmission shift line corresponding to the maximum transmission ratio of the troidal type continuously variable transmission 1, and Train indicates the transmission shift line corresponding to the minimum transmission ratio of the troidal type continuously variable transmission 1. A predetermined engine rotation number NE1 is the engine rotation number at which the discharge flow rate of the hydraulic oil to the control system 90A by the main pump 96 driven by the engine 21 can be ensured for greater than or equal to a necessary flow rate of the hydraulic oil necessary in the control system 90A.

In other words, in this case, the switching controller 66 reduces the pump load (pump drive loss) in the sub-pump 97 and enhances the fuel consumption by switching the discharging destination of the sub-pump 97 to the lubricating system 90B, which is the low pressure system, by the switching valve 98 if the engine rotation number NE of the engine 21 for driving the main pump 96 is greater than or equal to the predetermined engine rotation number NE1 (if the relationship of the engine rotation number NE and the vehicle speed V is within the region T1 in the current operations state). If the engine rotation number NE is smaller than the predetermined engine rotation number NE1 (if the relationship of the engine rotation number NE and the vehicle speed V is within the region T2 in the current operations state), the switching controller 66 basically switches the discharging destination of the sub-pump 97 to the control system 90A, which is the high pressure system, by the switching valve 98 to suppress the actual discharge flow rate of the hydraulic oil to the control system 90A from lacking with respect to the necessary flow rate of the hydraulic oil in the control system 90A. The reference engine rotation number NE0, which is the boundary on the low engine rotation number side in the region T2, is the engine rotation number that acts as a reference in the driving of the main pump 96 and the sub-pump 97, and is the minimum engine rotation number in the usual operation state of the engine 21 or the rotation number around the idle rotation number, for example.

In the hydraulic control device 9 configured to include such discharge volume variable pump device 92, the reduction of the pump load (pump drive loss) and further enhancement of the fuel consumption are desired even if the engine rotation number NE is smaller than the predetermined engine rotation number NE1. In other words, in the hydraulic control device 9, the operation region in which the pump load (pump drive loss) can be reduced and the fuel consumption can be enhanced by switching the discharging destination of the sub-pump 97 to the lubricating system 90B or the low pressure system by the switching valve 98 is desirably extended. Furthermore, in the hydraulic control device 9, the lack of discharge flow rate of the hydraulic oil to the control system 90A may occur such as in time of sudden transmission shift of the troidal type continuously variable transmission 1 even if the engine rotation number NE is smaller than the predetermined engine rotation number NE1 and the lack of discharge flow rate of the hydraulic oil to the control system 90A is suppressed with respect to the necessary flow rate of the hydraulic oil in the control system 90A by setting the discharging destination of the sub-pump 97 to the control system 90A or the high pressure system by the switching valve 98. That is, the more appropriate switching of the discharge volume corresponding to the operation state is desired in the hydraulic control device 9 configured to include the discharge volume variable pump device 92.

The hydraulic control device 9 of the troidal type continuously variable transmission 1 sets the discharging destination of the sub-pump 97 to the lubricating system 90B or the low pressure system by the switching valve 98 to extend the operation region in which the pump load (pump drive loss) can be reduced and the fuel consumption can be enhanced since the necessary flow rate of the hydraulic oil necessary in the control system 90A is actually small if the necessary flow rate of the hydraulic oil necessary in the control system 90A can be covered with the discharge flow rate of the hydraulic oil to the control system 90A by the main pump 96 and the operation state of the vehicle 1A mounted with the troidal type continuously variable transmission 1 is a state close to a steady operation state even if the engine rotation number NE is smaller than the predetermined engine rotation number NE1.

Furthermore, the hydraulic control device 9 of the troidal type continuously variable transmission 1 of the present embodiment controls the control system 90A to relatively delay the transmission shift when at least the discharge volume of the hydraulic oil to the control system 90A by the pump device 92 is switched from a relatively small volume to a relatively large volume with the transmission shift, that is, when switching the discharging destination of the sub-pump 97 from the lubricating system 90B or the low pressure system to the control system 90A or the high pressure system by the switching valve 98, so that the actual discharge flow rate of the hydraulic oil to the control system 90A can be suppressed from lacking with respect to the necessary flow rate of the hydraulic oil in the control system 90A at the time of sudden transmission shift of the troidal type continuously variable transmission 1.

In the following description, the state in which the discharging destination of the sub-pump 97 is set to the lubricating system 90B or the low pressure system, that is, the state in which the discharging source of the hydraulic oil to the control system 90A is only the main pump 96 of the main pump 96 and the sub-pump 97 in the pump device 92 is referred to as "1 discharge state" unless particularly stated. The state in which the discharging destination of the sub-pump 97 is set to the control system 90A or the high pressure system, that is, the state in which the discharging source of the hydraulic oil to the control system 90A is both the main pump 96 and the sub-pump 97 in the pump device 92 is referred to as "2 discharge state".

Specifically, the switching controller 66 serving as the switching control means of the present embodiment sets the discharge volume of the hydraulic oil to the control system 90A by the pump device 92 to a relatively small volume when the engine rotation number NE is greater than or equal to the predetermined engine rotation number NE1. In other words, the switching controller 66 realizes the 1 discharge state by the main pump 96 for the discharge state of the hydraulic oil to the control system 90A by setting the discharging destination of the sub-pump 97 to the lubricating system 90B or the low pressure system by the switching valve 98 when determined that the current engine rotation number NE is greater than or equal to the predetermined engine rotation number NE1.

The switching controller 66 sets the discharge volume of the hydraulic oil to the control system 90A by the pump device 92 to a relatively small volume when the engine rotation number NE is smaller than the predetermined engine rotation number NE1 and if the operation state of the vehicle 1A mounted with the troidal type continuously variable transmission 1 is a state close to the steady operation state, and sets the discharge volume of the hydraulic oil to the control system 90A by the pump device 92 to a relatively large volume if the operation state is a state close to the non-steady operation state. In other words, the switching controller 66 sets the discharging destination of the sub-pump 97 to the lubricating system 90B or the low pressure system by the switching valve 98 when determined that the current engine rotation number NE is smaller than the predetermined engine rotation number NE1 and that the operation state of the vehicle 1A is a state close to the steady operation state to have the discharge state of the hydraulic oil to the control system 90A in the 1 discharge state by the main pump 96, and sets the discharging destination of the sub-pump 97 to the control system 90A or the high pressure system by the switching valve 98 when determined that the current engine rotation number NE is smaller than the predetermined engine rotation number NE1 and that the operation state of the vehicle 1A is a state close to the non-steady operation state to have the discharge state of the hydraulic oil to the control system 90A in the 2 discharge state by the main pump 96 and the sub-pump 97. The switching controller 66 may determine whether the current operation state of the vehicle 1A is the steady operation state or the non-steady operation state based on the detection signal of various types of sensors, the control signal to each unit of the vehicle 1A including the troidal type continuously variable transmission 1, and the like.

As a result, the hydraulic control device 9 of the troidal type continuously variable transmission 1 sets the discharging destination of the sub-pump 97 to the lubricating system 90B or the low pressure system by the switching valve 98 and sets the discharge volume of the hydraulic oil to the control system 90A by the pump device 92 to a relatively small volume when the operation state of the vehicle 1A mounted with the troidal type continuously variable transmission 1 is a state close to the steady operation state even if the engine rotation number NE is smaller than the predetermined engine rotation number NE1, so that the pump load (pump drive loss) by the sub-pump 97 can be reduced and the fuel consumption can be further enhanced. The hydraulic control device 9 of the troidal type continuously variable transmission 1 sets the discharging destination of the sub-pump 97 to the lubricating system 902 or the low pressure system by the switching valve 98 and sets the discharge volume of the hydraulic oil to the control system 90A by the pump device 92 to a relatively large volume when the engine rotation number NE is smaller than the predetermined engine rotation number NE1 and the operation state of the vehicle 1A mounted with the troidal type continuously variable transmission 1 is a state close to the non-steady operation state, so that the actual discharge flow rate of the hydraulic oil to the control system 90A can be suppressed from lacking with respect to the necessary flow rate of the hydraulic oil in the control system 90A. The hydraulic control device 9 of the troidal type continuously variable transmission 1 thus can appropriately switch the discharge volume of the hydraulic oil according to the operation state.

The transmission ratio controller 65 serving as the transmission ratio control means controls the control system 90A and executes transmission shift delay control of relatively delaying the transmission shift when the discharge volume of the hydraulic oil to the control system 90A by the pump device 92 is switched from a relatively small volume to a relatively large volume, that is, when the discharging destination of the sub-pump 97 is switched to the control system 90A or the high pressure system by the switching valve 98. The transmission ratio controller 65 preferably executes the transmission shift delay control in the period from when the switching of the discharge volume of the pump device 92 is started until the switching of the actual discharge volume of the pump device 92 to a relatively large volume is finished. The transmission ratio controller 65 of the present embodiment may control the control system 90A and relatively delay the transmission shift than the usual transmission shift when switching the discharge state of the hydraulic oil to the control system 90A from the 1 discharge state by the main pump 96 to the 2 discharge state by the main pump 96 and the sub-pump 97 and not limited to sudden transmission shift.

The switching start time point of the discharge volume of the pump device 92 is the time point which a switching command of the discharge volume is output from the switching controller 66 to the pump device 92, for example, and the switching finish time point of the discharge volume of the pump device 92 is the time point which the discharge flow rate of the hydraulic oil to the control system 90A by the pump device 92 actually finished increasing up to the total discharge flow rate of the main pump 96 and the sub-pump 97. The transmission ratio controller 65 may determine the switching finish time point of the discharge volume of the pump device 92 based on the actual measurement value of the discharge flow rate of the hydraulic oil to the control system 90A by a sensor (not illustrated) or the like, or may be determine the same based on whether or not a predetermined time set in advance has elapsed from the switching start time point. That is, the transmission ratio controller 65 may grasp a predetermined time from the switching start time point of the discharge volume of the pump device 92 to the time point of the discharge flow rate of the hydraulic oil to the control system 90A by the pump device 92 actually increases up to the total discharge flow rate of the main pump 96 and the sub-pump 97 through tests, and the like in advance and store the same in the storage unit 60b, and the transmission ratio controller 65 may estimate the time point which the predetermined time has elapsed from the switching start time point as the switching finish time point.

As a result, the hydraulic control device 9 of the troidal type continuously variable transmission 1 controls the control system 90A and executes the transmission shift delay control of relatively delaying the transmission shift when the discharge volume of the hydraulic oil to the control system 90A by the pump device 92 switches from a relatively small volume to a relatively large volume with the transmission shift, so that the supply of a great amount of hydraulic oil can be prevented from being requested to the control system 90A in the period from when the switching command of the discharge volume is output to the pump device 92 until the discharge flow rate of the hydraulic oil to the control system 90A by the pump device 92 actually finishes increasing up to the total discharge flow rate of the main pump 96 and the sub-pump 97 at the beginning of the sudden transmission shift of the troidal type continuously variable transmission 1. As a result, the hydraulic control device 9 of the troidal type continuously variable transmission 1 can prevent the supply of a great amount of hydraulic oil from being requested to the control system 90A at least at the beginning of the sudden transmission shift of the troidal type continuously variable transmission 1, so that the lack of actual discharge flow rate of the hydraulic oil to the control system 90A can be suppressed with respect to the necessary flow rate of the hydraulic oil to the control system 90A as the actual rise of the total discharge flow rate of the main pump 96 and the sub-pump 97 is delayed at the beginning of the sudden transmission shift, and hence the discharge volume of the hydraulic oil can be appropriately switched according to the operation state.

Therefore, the hydraulic control device 9 of the troidal type continuously variable transmission 1 can suppress the actual discharge flow rate of the hydraulic oil to the control system 90A from lacking with respect to the necessary flow rate of the hydraulic oil in the control system at the time of the sudden transmission shift of the troidal type continuously variable transmission 1, and hence the hydraulic oil supplied to the sandwiching force generating hydraulic chamber 15a of the hydraulic pressing mechanism configuring the control system 90A can be prevented from lacking, and the sandwiching force for sandwiching the power roller 4 between the input disc 2 and the output disc 3 can be prevented from becoming excessively small and lacking. Therefore, when the discharge volume of the hydraulic oil to the control system 90A by the pump device 92 switches from a relatively small volume to a relatively large volume with the sudden transmission shift, the hydraulic control device 9 of the troidal type continuously variable transmission 1 can prevent the power roller 4 from slipping when the contacting surface pressure acting on the contacting portion of the troidal surfaces 2a, 3a of the input disc 2 and the output disc 3 and the contacting surface 4a of the power roller 4 becomes too low with respect to the input torque to the troidal type continuously variable transmission 1.

The transmission ratio controller 65 may control the transmission ratio changing unit 5 forming the control system 90A and execute the transmission shift delay control of relatively delaying the transmission shift by relatively lowering the transmission shift speed of the transmission shift, or may control the transmission ratio changing unit 5 forming the control system 90A and execute the transmission shift delay control of relatively delaying the transmission shift by relatively delaying the start time point of the transmission shift.

When controlling the transmission ratio changing unit 5 forming the control system 90A and executing the transmission shift delay control by relatively lowering the transmission shift speed of the transmission shift (amount of change (change rate) per unit time of transmission ratio), the transmission ratio controller 65 lowers the transmission shift speed of the transmission shift than the transmission shift speed at the usual transmission shift. As described above, the transmission ratio controller 65 usually calculates the request drive force based on the accelerator opening, the vehicle speed, and the like, calculates the target output, calculates the target input rotation number, and controls the transmission ratio changing unit 5 to control the actual transmission ratio such that the actual input rotation number to the input disc 2 becomes the target input rotation number. When executing the transmission shift delay control, the transmission ratio controller 65 calculates the transmission shift delay control target input rotation number in which the amount of change (change rate) of the input rotation number per unit time is smaller than the usual target input rotation number, and controls the transmission ratio changing unit 5 to control the transmission ratio such that the actual input rotation number becomes the transmission shift delay control target input rotation number so that the speed of the tilt of the power roller 4 becomes relatively low and the transmission shift speed becomes relatively low.

When controlling the transmission ratio changing unit 5 forming the control system 90A and executing the transmission shift delay control by relatively delaying the start time point of the transmission shift, the transmission ratio controller 65 may control the transmission ratio changing unit 5 such that the start time point of the transmission shift becomes after the switching finish time point of the discharge volume of the pump device 92. In other words, in such a case, the transmission ratio controller 65 controls the transmission ratio changing unit 5 forming the control system 90A to start the actual sudden transmission shift after the discharge flow rate of the hydraulic oil to the control system 90A by the pump device 92 is actually increased to the total discharge flow rate of the main pump 96 and the sub-pump 97 rather than controlling the transmission ratio changing unit 5 forming the control system 90A and starting the actual sudden transmission shift right after the sudden transmission shift request is detected.

The switching controller 66 of the present embodiment controls the pump device 92 and relatively increases the switching speed of the discharge volume of the hydraulic oil to the control system 90A when the transmission ratio controller 65 controls the control system 90A and delays the transmission shift. That is, the switching controller 66 controls the switching valve 98 to relatively increase the speed of switching the discharging destination of the sub-pump 97 from the lubricating system 90B to the control system 90A.

As described above, the switching valve 98 has the spool valve member moved to the ON position when a predetermined amount of drive current is supplied to the solenoid 98a and the pressing force by the solenoid 98a acting on the spool valve member (not illustrated) becomes greater than the bias force by the elastic member 98b acting on the relevant spool valve member, whereby the second discharge oil passage 94d and the control system discharge oil passage 94e are connected and the discharging destination of the sub-pump 97 is switched from the lubricating system 90B to the control system 90A. The switching controller 66 can enhance the responsiveness of switching by the switching valve 98 by raising the movement speed of the spool valve member towards the ON position in this case to higher than the movement speed in the usual switching. That is, the switching controller 66 can enhance the responsiveness of switching by the switching valve 98 by setting the pressing force of the switching valve 98 towards the ON position side that acts on the spool valve member to greater than the usual time. The switching controller 66 can increase the pressing force for moving the spool valve member towards the ON position side by the solenoid 98a by increasing the voltage to be applied on the solenoid 98a to higher than the usual. Furthermore, in the configuration of acting the control hydraulic pressure towards the ON position side on the spool valve member based on the line pressure, and causing the spool valve member to move to the ON position when the pressing force by the control hydraulic pressure becomes greater than the bias force by the elastic member 98b that acts on the relevant spool valve member, the movement speed of the spool valve member towards the ON position side can be increased and the responsiveness of switching by the switching valve 98 can be enhanced by increasing the line pressure to higher than the usual and increasing the pressing force by the control hydraulic pressure towards the ON position side that acts on the spool valve member.

Therefore, the hydraulic control device 9 of the troidal type continuously variable transmission 1 can reduce the switching period of switching the discharge state of the hydraulic oil to the control system 90A from the 1 discharge state by the main pump 96 to the 2 discharge state by the main pump 96 and the sub-pump 97 as the switching controller 66 controls the pump device 92 and relatively increases the switching speed of the discharge volume of the hydraulic oil to the control system 90A when the transmission ratio controller 65 controls the control system 90A to delay the transmission shift. Therefore, the hydraulic control device 9 of the troidal type continuously variable transmission 1 can reduce the period of controlling the control system 90A and delaying the transmission shift as the switching period of the discharge volume of the hydraulic oil to the control system 90A can be reduced, and hence the occurrence of a so-called hesitation (degradation of responsiveness) caused by the delay in responsiveness of the actual transmission shift with respect the kick down transmission shift (transmission shift request) involved in acceleration request and the like by the driver can be suppressed.

The switching control of the discharge volume of the pump device 92 of the hydraulic control device 9 of the troidal type continuously variable transmission 1 will now be described with reference to the flowchart of FIG. 8 and the timing chart of FIG. 9. In FIG. 9, the vertical axis is the accelerator opening, the switching state of the discharge volume of the pump device 92, the target input rotation number (correspond to target transmission ratio), and the discharge flow rate of the hydraulic oil to the control system 90A by the pump device 92, and the horizontal axis is the time axis. The control routine is repeatedly executed at a control cycle of every few ms or a few dozen ms.

First, the switching controller 66 of the ECU 60 acquires the current temperature of the hydraulic oil based on the detection signal of the hydraulic oil temperature sensor 58 and determines whether or not the current temperature of the hydraulic oil is within a predetermined range set in advance (S100). If the temperature of the hydraulic oil is lower than the predetermined temperature set in advance, the hydraulic control device 9 tends to have the discharge flow rate of the hydraulic oil to the control system 90A and the like relatively reduced since the hydraulic oil has high viscosity and the hydraulic oil becomes hard to flow. If the temperature of the hydraulic oil is higher than the predetermined temperature set in advance, the hydraulic control device 9 tends to have the pressure of the hydraulic oil to the control system 90A and the like relatively reduced although the hydraulic oil has low viscosity and the hydraulic oil easily flows since the amount of leakage of the hydraulic oil from various gaps increases by that much. Therefore, when determined that the temperature of the hydraulic oil is outside the predetermined range set in advance (S100: No), the switching controller 66 controls the drive of the switching valve 98 and switches the discharge state of the hydraulic oil to the control system 90A by the pump device 92 to 2 discharge state.

When determined that the current temperature of the hydraulic oil is within the predetermined range set in advance (S100: Yes), the switching controller 66 acquires the current engine rotation number NE based on the detection signal of the engine rotation number sensor 52, and determines whether or not the current engine rotation number NE is greater than or equal to the engine rotation number NE1 set in advance (S102).

When determined that the current engine rotation number NE is smaller than the engine rotation number NE1 (S102: No), the switching controller 66 acquires the current vehicle speed of the vehicle 1A based on the detection signal of the vehicle speed sensor 56, and determines whether or not the current vehicle speed of the vehicle 1A is greater than or equal to a predetermined vehicle speed set in advance (S104).

When determined that the current engine rotation number NE is greater than or equal to the engine rotation number NE1 in S102 (S102: Yes), and when determined that the current vehicle speed of the vehicle 1A is greater than or equal to a predetermined vehicle speed in S104 (S104: Yes), the switching controller 66 controls the drive of the switching valve 98 and switches the discharge state of the hydraulic oil to the control system 90A by the pump device 92 to 1 discharge state (S120, e.g., time t1 in FIG. 9), and the transmission ratio controller 65 sets the transmission shift delay control flag to OFF (S122), terminates the current control cycle, and shifts to the next control cycle. In this case, the switching controller 66 continues the 1 discharge state if the discharge state of the hydraulic oil to the control system 90A by the pump device 92 is originally 1 discharge state in S120, and the transmission ratio controller 65 continues the OFF state if the transmission shift delay control flag is originally set to OFF in S122. This is similar in the following description. As a result, the hydraulic control device 9 of the troidal type continuously variable transmission 1 can reduce the pump load (pump drive loss) by the sub-pump 97 and enhance the fuel consumption by setting the discharge volume of the hydraulic oil to the control system 90A by the pump device 92 to a relatively small volume.

When determined that the current vehicle speed of the vehicle 1A is smaller than the predetermined vehicle speed in S104 (S104: No), the switching controller 66 determines whether or not a sudden transmission shift request is made by the driver (S106). The switching controller 66 determines the presence of a so-called kick down transmission shift request by the accelerator pedal operation of the driver or the presence of the shift operation in a so-called manual mode based on the detection signals of various types of sensors and the control signal to each unit of the vehicle 1A including the troidal type continuously variable transmission 1, and determines whether or not the sudden transmission shift request is made by the driver.

When determined that the sudden transmission shift request is not made by the driver (S106: Yes), the switching controller 66 determines whether or not the pressing force increase control by the sandwiching force controller 63 is non-active (S108). The switching controller 66 determines whether or not the pressing force increase control by the sandwiching force controller 63 is non-active based on the detection signals of various types of sensors and the control signal to each unit of the vehicle 1A including the troidal type continuously variable transmission 1. The pressing force increase control by the sandwiching force controller 63 is the control executed in a non-steady state such as at the time of tire slippage or at the time of so-called ABS activation, and is a control of controlling the hydraulic pressing mechanism 15 by the sandwiching force controller 63 and increasing the sandwiching and pressing force generated by the hydraulic pressing mechanism 15 to higher than the usual operation state. The hydraulic control device 9 is in a state the necessary flow rate of the hydraulic oil to the sandwiching force generating hydraulic chamber 15a of the hydraulic pressing mechanism 15 forming the control system 90A is relatively large when the sandwiching force controller 63 is executing the pressing force increase control. Thus, when determined that the pressing force increase control by the sandwiching force controller 63 is active (S108: No), that is, when determined as the non-steady operation state, the switching controller 66 controls the drive of the switching valve 98 and switches the discharge state of the hydraulic oil to the control system 90A by the pump device 92 to the 2 discharge state, as will be described later.

When determined that the pressing force increase control by the sandwiching force controller 63 is non-active (S108: Yes), the switching controller 66 determines whether or not a command pressing force by the sandwiching force controller 63 is smaller than or equal to a predetermined value set in advance (S110). The switching controller 66 determines whether or not the command pressing force by the sandwiching force controller 63 is smaller than or equal to a predetermined value set in advance based on the detection signals of various types of sensors and the control signal to each unit of the vehicle 1A including the troidal type continuously variable transmission 1. The command pressing force by the sandwiching force controller 63 is the command value (request sandwiching and pressing force) of the sandwiching and pressing force output from the sandwiching force controller 63 with respect to the hydraulic pressing mechanism 15 that generates the sandwiching and pressing force, and is set to be higher than a predetermined value set in advance to a non-steady state in which the input torque to the troidal type continuously variable transmission 1 is relatively high in the high load operation state. If the command pressing force by the sandwiching force controller 63 is set to a value greater than the predetermined value set in advance, the hydraulic control device 9 is in a state the necessary flow rate of the hydraulic oil to the sandwiching force generating hydraulic chamber 15a of the hydraulic pressing mechanism 15 forming the control system 90A is relatively large.

Thus, when determined that the command pressing force by the sandwiching force controller 63 is greater than the predetermined value set in advance (S110: No), that is, when determined as the non-steady operation, the switching controller 66 controls the drive of the switching valve 98 and switches the discharge state of the hydraulic oil to the control system 90A by the pump device 92 to the 2 discharge state, as will be described later.

When determined that the command pressing force by the sandwiching force controller 63 is smaller than or equal to the predetermined value set in advance (S110: Yes), the switching controller 66 determines whether or not a command pressing force change amount by the sandwiching force controller 63 is smaller than or equal to a predetermined amount set in advance (S112). The switching controller 66 determines whether or not the command pressing force change amount by the sandwiching force controller 63 is smaller than or equal to the predetermined amount set in advance based on the detection signals of various types of sensors and the control signal to each unit of the vehicle 1A including the troidal type continuously variable transmission 1. The command pressing force chamber amount by the sandwiching force controller 63 is the amount of change (change rate) per unit time of the command value (request sandwiching and pressing force) of the sandwiching and pressing force output from the sandwiching force controller 63 with respect to the hydraulic pressing mechanism 15 that generates the sandwiching and pressing force. If the command pressing force change amount by the sandwiching force controller 63 is greater than the predetermined amount set in advance, the hydraulic control device 9 is in a state the necessary flow rate of the hydraulic oil to the sandwiching force generating hydraulic chamber 15a of the hydraulic pressing mechanism 15 forming the control system 90A is relatively large. Thus, when determined that the command pressing force change amount by the sandwiching force controller 63 is greater than the predetermined amount set in advance (S112: No), that is, when determined as the non-steady operation state, the switching controller 66 controls the drive of the switching valve 98 and switches the discharge state of the hydraulic oil to the control system 90A by the pump device 92 to the 2 discharge state, as will be described later.

When determined that the command pressing force change amount by the sandwiching force controller 63 is smaller than or equal to the predetermined value set in advance (S112: Yes), the switching controller 66 determines whether or not a transmission shift instruction flow rate by the transmission ratio controller 65 is smaller than or equal to a predetermined flow rate set in advance (S114). The switching controller 66 determines whether or not the transmission shift instruction flow rate by the transmission ratio controller 65 is smaller than or equal to the predetermined flow rate set in advance based on the detection signals of various types of sensors and the control signal to each unit of the vehicle 1A including the troidal type continuously variable transmission 1. The transmission shift instruction flow rate by the transmission ratio controller 65 is the flow rate of the hydraulic oil to the transmission shift control hydraulic chamber 82 corresponding to the command value (request transmission shift control pressing force) of the transmission shift control pressing force output from the transmission ratio controller 65 with respect to the transmission ratio changing unit 5 that generates the transmission shift control pressing force. If the transmission shift instruction flow rate by the transmission ratio controller 65 is greater than the predetermined flow rate set in advance, the hydraulic control device 9 is in a state the necessary flow rate of the hydraulic oil to the transmission shift control hydraulic chamber 82 of the transmission ratio changing unit 5 forming the control system 90A is relatively large. Thus, when determined that the transmission shift instruction flow rate by the transmission ratio controller 65 is greater than the predetermined flow rate set in advance (S114: No), that is, when determined as the non-steady operation state, the switching controller 66 controls the drive of the switching valve 98 and switches the discharge state of the hydraulic oil to the control system 90A by the pump device 92 to the 2 discharge state, as will be described later.

When determined that the transmission shift instruction flow rate by the transmission ratio controller 65 is smaller than or equal to the predetermined flow rate set in advance (S114: Yes), the switching controller 66 determines whether or not the L/U engagement transient control by the torque converter controller 61 is being executed (S116). The switching controller 66 determines whether or not the L/U engagement transient control by the torque converter controller 61 is being executed based on the detection signals of various types of sensors and the control signal to each unit of the vehicle 1A including the troidal type continuously variable transmission 1. The L/U engagement transient control by the torque converter controller 61 is the control executed during engagement or during disengagement of the lock up clutch of the torque converter 22.

When determined that the L/U engagement transient control by the torque converter controller 61 is being executed (S116: Yes), the switching controller 66 terminates the current control cycle without switching to the 1 discharge state, and shifts to the next control cycle.

When determined that the L/U engagement transient control by the torque converter controller 61 is not being executed (S116: No), the switching controller 66 determines whether or not the discharge flow rate of the hydraulic oil to the control system 90A by the pump device 92 of when the discharge state of the hydraulic oil to the control system 90A by the pump device 92 is 1 discharge state, that is, the discharge flow rate of the hydraulic oil to the control system 90A by the main pump 96 is greater than or equal to the necessary flow rate of the hydraulic oil in the current control system 90A (S118). The switching controller 66 acquires and compares the discharge flow rate of the hydraulic oil to the control system 90A by the main pump 96 and the necessary flow rate of the hydraulic oil in the current control system 90A based on the detection signals of various types of sensors and the control signal to each unit of the vehicle 1A including the troidal type continuously variable transmission 1, and determines whether or not the discharge flow rate of the hydraulic oil to the control system 90A by the main pump 96 is greater than or equal to the necessary flow rate of the hydraulic oil in the current control system 90A. As described above, the necessary flow rate of the hydraulic oil in the control system 90A is the flow rate of the hydraulic oil required in the entire control system 90A such as the necessary flow rate of the hydraulic oil to the transmission shift control hydraulic chamber 82 corresponding to the transmission ratio of the troidal type continuously variable transmission 1 and the necessary flow rate of the hydraulic oil to the sandwiching force generating hydraulic chamber 15a corresponding to the contacting surface pressure of the troidal surfaces 2a, 3a of the input disc 2, the output disc 3, and the contacting surface 4a of the power roller 4.

When determined that the discharge flow rate of the hydraulic oil to the control system 90A by the pump device 92 when the discharge state of the hydraulic oil to the control system 90A by the pump device 92 is 1 discharge state (discharge flow rate of the hydraulic oil to the control system 90A by the main pump 96) is less than the necessary flow rate of the hydraulic oil in the current control system 90A (S118: No), the switching controller 66 terminates the current control cycle as is without switching to the 1 discharge state, and shifts to the next control cycle.

When determined that the discharge flow rate of the hydraulic oil to the control system 90A by the pump device 92 when the discharge state of the hydraulic oil to the control system 90A by the pump device 92 is 1 discharge state (discharge flow rate of the hydraulic oil to the control system 90A by the main pump 96) is greater than or equal to the necessary flow rate of the hydraulic oil in the current control system 90A (S118: Yes), the switching controller 66 controls the drive of the switching valve 98 and switches the discharge state of the hydraulic oil to the control system 90A by the pump device 92 to 1 discharge state (S120, e.g., time t1 in FIG. 9), and the transmission ratio controller 65 sets the transmission shift delay control flag to OFF (S122), terminates the current control cycle and shifts to the next control cycle. As a result, the hydraulic control device 9 of the troidal type continuously variable transmission 1 can reduce the pump load (pump drive loss) by the sub-pump 97 and further improve the fuel consumption by setting the discharge volume of the hydraulic oil to the control system 90A by the pump device 92 to a relatively small volume when the operation state of the vehicle 1A mounted with the troidal type continuously variable transmission 1 is in a state close to the steady operation state even if the engine rotation number NE is smaller than the predetermined engine rotation number NE1.

When determined that the temperature of the hydraulic oil is outside the predetermined range set in advance in S100 (S100: No), when determined a sudden transmission shift request is made by the driver in S106 (S106: No), when determined that the pressing force increase control by the sandwiching force controller 63 is active in S108 (S108: No), when determined that the command pressing force by the sandwiching force controller 63 is greater than the predetermined value set in advance in S110 (S110: No), when determined that the command pressing force change amount by the sandwiching force controller 63 is greater than the predetermined amount set in advance in S112 (S112: No), when determined that the transmission shift instruction flow rate by the transmission ratio controller 65 is greater than the predetermined flow rate set in advance in S114 (S114: No), and when determined that the operation state of the vehicle 1A mounted with the troidal type continuously variable transmission 1 is a non-steady operation state, the switching controller 66 controls the drive of the switching valve 98 to switch the discharge state of the hydraulic oil to the control system 90A by the pump device 92 to the 2 discharge state (S124, e.g., time t2 in FIG. 9).

The transmission ratio controller 65 determines whether or not a predetermined time set in advance has elapsed from the switching start time point of the discharge volume of the pump device 92, that is, the time point (e.g., time t2 in FIG. 9) at which the switching command of the discharge volume is output from the switching controller 66 to the pump device 92 (S126).

When determined that the predetermined time set in advance has not elapsed from the time point which the switching command of the discharge volume is output from the switching controller 66 to the pump device 92 (S126: Yes), that is, when determined that the discharge flow rate of the hydraulic oil to the control system 90A by the pump device 92 is not actually increased to the total discharge flow rate of the main pump 96 and the sub-pump 97, the transmission ratio controller 65 sets the transmission shift delay control flag to ON, controls the transmission ratio changing unit 5 forming the control system 90A, and executes the transmission shift delay control of relatively delaying the transmission shift (S128). As a result, the hydraulic control device 9 of the troidal type continuously variable transmission 1 can suppress the actual discharge flow rate of the hydraulic oil to the control system 90A from lacking with respect to the necessary flow rate of the hydraulic oil to the control system 90A due to the delay in the rise of the actual total discharge flow rate of the main pump 96 and the sub-pump 97.

The switching controller 66 controls the drive of the switching valve 98 and relatively increases the switching speed of the discharge volume to the control system 90A by the pump device 92 (S130), terminates the current control cycle, and shifts to the next control cycle. As a result, the hydraulic control device 9 of the troidal type continuously variable transmission 1 can reduce the execution period of the transmission shift delay control of delaying the transmission shift, and suppress the occurrence of hesitation (degradation of responsiveness).

When determined that the predetermined time set in advance has elapsed from the time point which the switching command of the discharge volume is output from the switching controller 66 to the pump device 92 in S126 (S126: No), that is, when the discharge flow rate of the hydraulic oil to the control system 90A by the pump device 92 is actually increased up to the total discharge flow rate of the main pump 96 and the sub-pump 97 (e.g., time t3 in FIG. 9), the transmission ratio controller 65 sets the transmission shift delay control flag to OFF (S132), shifts to the normal transmission shift control and terminates the current control cycle, and shifts to the next control cycle.

According to the hydraulic control device 9 of the troidal type continuously variable transmission 1 according to the embodiment of the present invention described above, there is provided the hydraulic control device 9 of the troidal type continuously variable transmission 1 in which the drive force can be transmitted from the input disc 2 on the input side to the output disc 3 on the output side through the power roller 4 serving as a transmitting member, and the transmission ratio, which is the rotation speed ratio of the input disc 2 and the output disc 3, can be changed in a non-step wise manner, the hydraulic control device 9 including a pump device 92 capable of switching the discharge volume of the hydraulic oil to the control system 90A in which the contacting surface pressure of the input disc 2, the output disc 3, and the power roller 4, and the transmission ratio are controlled by the pressure of the hydraulic oil, in plural stages, and a transmission ratio controller 65 for controlling the control system 90A and relatively delaying the transmission shift when the discharge volume of the hydraulic oil to the control system 90A by the pump device 92 switches from a relatively small volume to a relatively large volume with the transmission shift.

According to the troidal type continuously variable transmission 1 according to the embodiment of the present invention described above, the hydraulic control device 9 and the power roller 4 forming the transmitting member are arranged.

Therefore, the troidal type continuously variable transmission 1, the hydraulic control device 9 control the control system 90A and execute the transmission shift delay control for relatively delaying the transmission shift when the discharge volume of the hydraulic oil to the control system 90A by the pump device 92 switches from a relatively small volume to a relatively large volume with the transmission shift, so that the actual discharge flow rate of the hydraulic oil to the control system 90A can be suppressed from lacking with respect to the necessary flow rate of the hydraulic oil to the control system 90A due to the delay in the rise of the actual total discharge flow rate of the main pump 96 and the sub-pump 97, and consequently, the discharge volume of the hydraulic oil can be appropriately switched according to the operation state.

According to the troidal type continuously variable transmission 1, the hydraulic control device 9 of the embodiment of the present invention described above, the transmission ratio controller 65 may control the control system 90A to relatively lower the transmission shift speed of the transmission shift when the discharge volume of the hydraulic oil to the control system 90A by the pump device 92 switches from a relatively small volume to a relatively large volume with the transmission shift.

In this case, the troidal type continuously variable transmission 1, the hydraulic control device 9 can have the transmission ratio controller 65 control the control system 90A and execute the transmission shift delay control for relatively delaying the transmission shift by relatively lowering the transmission shift speed of the transmission shift.

According to the troidal type continuously variable transmission 1, the hydraulic control device 9 of the embodiment of the present invention described above, the transmission ratio controller 65 may control the control system 90A to relatively delay the transmission shift start time point when the discharge volume of the hydraulic oil to the control system 90A by the pump device 92 switches from a relatively small volume to a relatively large volume with the transmission shift. In this case, the troidal type continuously variable transmission 1, the hydraulic control device 9 can have the transmission ratio controller 65 control the control system 90A and execute the transmission shift delay control for relatively delaying the transmission shift by relatively delaying the transmission shift start time point.

Furthermore, according to the troidal type continuously variable transmission 1, the hydraulic control device 9 of the embodiment of the present invention described above, the transmission ratio controller 65 delays the transmission shift in the period from when the switching of the discharge volume of the pump device 92 started until the actual discharge volume of the pump device 92 finished switching to a relatively large volume. Therefore, the troidal type continuously variable transmission 1, the hydraulic control device 9 can prevent the supply of a great amount of hydraulic oil from being requested on the control system 90A during the period from when the switching command of the discharge volume is output to the pump device 92 until the discharge flow rate of the hydraulic oil to the control system 90A by the pump device 92 is actually finished increasing to the total discharge flow rate of the main pump 96 and the sub-pump 97, so that the actual discharge flow rate of the hydraulic oil to the control system 90A can be reliably suppressed from lacking with respect to the necessary flow rate of the hydraulic oil to the control system 90A.

Furthermore, according to the troidal type continuously variable transmission 1, the hydraulic control device 9 of the embodiment of the present invention described above, the switching controller 66 for controlling the pump device 92 and relatively increasing the switching speed of the discharge volume of the hydraulic oil to the control system 90A when the transmission ratio controller 65 controls the control system 90A and delays the transmission shift is arranged. Therefore, the troidal type continuously variable transmission 1, the hydraulic control device 9 can reduce the period of controlling the control system 90A and delaying the transmission shift as the switching period of the discharge volume of the hydraulic oil to the control system 90A can be reduced, and hence the occurrence of hesitation (degradation of responsiveness) can be suppressed.

Furthermore, according to the troidal type continuously variable transmission 1, the hydraulic control device 9 of the embodiment of the present invention described above, the pump device 92 includes the main pump 96 for discharging the hydraulic oil to the control system 90A, the sub-pump 97 for discharging the hydraulic oil to the control system 90A or the lubricating system 90B different from the control system 90A, and the switching valve 98 capable of switching the discharging destination of the hydraulic oil in the sub-pump 97 between the control system 90A and the lubricating system 90B. Therefore, the troidal type continuously variable transmission 1, the hydraulic control device 9 can switch the discharge volume of the hydraulic oil to the control system 90A by the pump device 92 in plural stages, or two stages herein, as the switching valve 98 switches the discharging destination of the hydraulic oil in the sub-pump 97 to either the control system 90A or the lubricating system 90B.

Moreover, according to the troidal type continuously variable transmission 1, the hydraulic control device 9 of the embodiment of the present invention described above, the control system 90A is configured to include the transmission ratio changing unit 5 for changing the transmission ratio by the pressure of the hydraulic oil supplied to the transmission shift control hydraulic chamber 82, and the hydraulic pressing mechanism 15 for changing the contacting surface pressure of the input disc 2, the output disc 3, and the power roller 4 by the pressure of the hydraulic oil supplied to the sandwiching force generating hydraulic chamber 15a. Therefore, the troidal type continuously variable transmission 1, the hydraulic control device 9 control the control system 90A and execute the transmission shift delay control of relatively delaying the transmission shift when the discharge volume of the hydraulic oil to the control system 90A by the pump device 92 switches from a relatively small volume to a relatively large volume with the transmission shift, so that the actual discharge flow rate of the hydraulic oil to the control system 90A can be suppressed from lacking with respect to the necessary flow rate of the hydraulic oil to the transmission shift control hydraulic chamber 82 of the transmission ratio changing unit 5 and the sandwiching force generating hydraulic chamber 15a of the hydraulic pressing mechanism 15 forming at least the control system 90A.

The continuously variable transmission according to the embodiment of the present invention described above is not limited to the embodiment described above, and various modifications may be made within a scope defined in the Claims. In the description made above, the continuously variable transmission is described as a troidal type continuously variable transmission of double cavity type, but is not limited there to, and may be a troidal type continuously variable transmission of single cavity type.

In the description made above, the continuously variable transmission of the present invention is described as a troidal type continuously variable transmission 1, but is not limited thereto.

Figure 10:
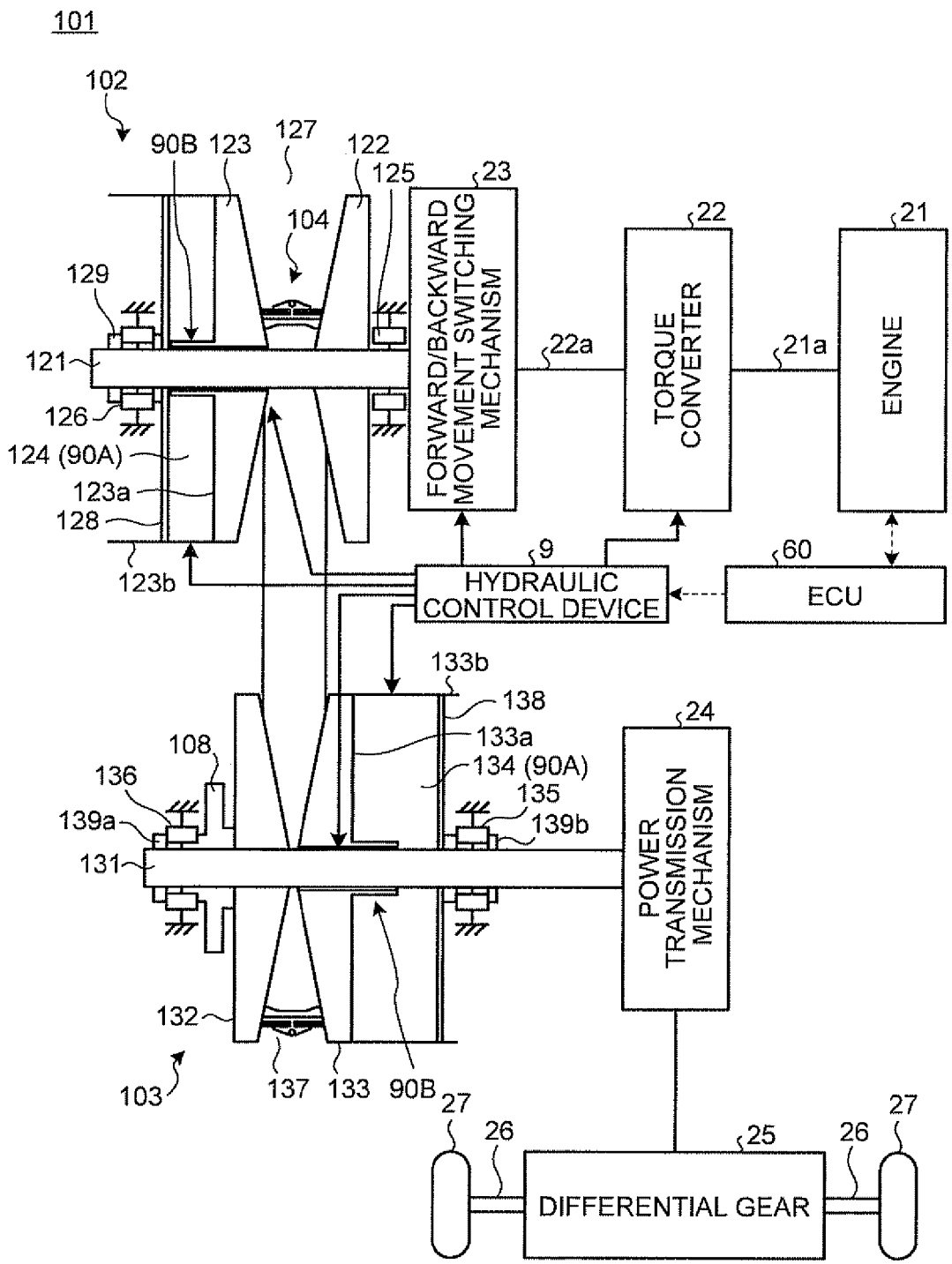
FIG. 10 is a schematic configuration diagram of a belt type continuously variable transmission in which a hydraulic control device according to a modification of the present invention is applied.

FIG. 10 is a schematic configuration diagram of a belt type continuously variable transmission applied with a hydraulic control device according to a modification of the present invention. In the description of FIG. 1 to FIG. 9 above, a case in which the hydraulic control device 9 serving as a medium pressure control device of the present invention is applied to the troidal type continuously variable transmission 1 serving as a continuously variable transmission has been described, but this is not the sole case, and the continuously variable transmission of the present invention can be applied to a so-called belt type continuously variable transmission 101, as illustrated in FIG. 10. In the figure, the configurations, operations, and effects common with the embodiment described above will be given the same reference numerals to omit redundant explanation as much as possible.

The belt type continuously variable transmission 101 serving as the continuously variable transmission according to the modification of the present invention is a so-called belt type continuously variable transmission capable of transmitting the drive force from the engine 21 from the rotation member on the input side to the rotation member on the output side by means of a belt 104 serving as a transmitting member, and capable of changing the transmission ratio, which is the rotation number ratio of the rotation member on the input side and the rotation member on the output side, in a non-step wise manner (continuously). In other words, the belt type continuously variable transmission 101 is configured to include a primary pulley 102 serving as the rotation member on the input side to which the drive force from the engine 21 is transmitted, a secondary pulley 103 serving as the rotation member on the output side for changing and outputting the drive force transmitted to the primary pulley 102, and the belt 104 serving as the transmitting member for transmitting the drive force transmitted to the primary pulley 102 to the secondary pulley 103. The belt type continuously variable transmission 101 is also configured to include the ECU 60 for controlling each unit of the engine 21 and each unit of the belt type continuously variable transmission 101, and the hydraulic control device 9 serving as the medium pressure control device for controlling the hydraulic pressure of each unit.

In the following description, the configuration of the engine 21, the torque converter 22, the forward/backward movement switching mechanism 23, the power transmission mechanism 24, the differential gear 25, and the like is substantially the same as that of the troidal type continuously variable transmission described above, and hence the description will be omitted. The ECU 60 of the present modification is configured to include the torque converter controller 61, the forward/backward movement switching controller 62, the sandwiching force controller 63, the engine controller 64, the transmission ratio controller 65, and the switching controller 66, similar to the ECU 60 of the first embodiment (FIG. 1), but the illustration thereof will be omitted here. Furthermore, the hydraulic control device 9 of the present modification is configured to include the discharge volume variable pump device 92 (see FIG. 1), similar to the hydraulic control device 9 of the first embodiment (see FIG. 1), but the illustration thereof will be omitted.

The belt type continuously variable transmission 101 is configured to include a primary pulley shaft 121 and a secondary pulley shaft 131, serving as two pulley shafts arranged in parallel with a predetermined interval, a primary fixing sieve 122 and a secondary fixing sieve 132, a primary movable sieve 123 and a secondary movable sieve 133, and the belt 104. The primary movable sieve 123 and the secondary movable sieve 133 are respectively arranged on the primary pulley shaft 121 and the secondary pulley shaft 131, and slidably move on the primary pulley shaft 121 and the secondary pulley shaft 131 on the axis line direction. The primary fixing sieve 122 and the secondary fixing sieve 132 are respectively arranged on the primary pulley shaft 121 and the secondary pulley shaft 131 facing the primary movable sieve 123 and the secondary movable sieve 133, and form a primary groove 127 and a secondary groove 137 with the primary movable sieve 123 and the secondary movable sieve 133. The belt 104 is wound on the primary groove 127 and the secondary groove 137 in the primary movable sieve 123, the secondary movable sieve 133, and the primary fixing sieve 122, the secondary fixing sieve 132, which are respectively arranged facing each other.

Specifically, the belt type continuously variable transmission 101 includes the primary pulley 102 serving as one pulley, the secondary pulley 103 serving as the other pulley, the belt 104, the ECU 60, and the hydraulic control device 9, as described above.

The primary pulley 102 is one pulley that transmits the engine torque transmitted through the forward/backward movement switching mechanism 23 to the secondary pulley 103, which is the other pulley, by the belt 104. In other words, the primary pulley 102 input with the engine torque (drive force) from the engine 21 (drive source) is one of the two pulleys arranged in the belt type continuously variable transmission 101.

The primary pulley 102 is configured by the primary pulley shaft 121, the primary fixing sieve 122, the primary movable sieve 123, and a primary hydraulic chamber 124 serving as the transmission shift control pressure chamber for changing the transmission ratio of the belt type continuously variable transmission 101 by causing the primary pulley 102 to generate the belt sandwiching force.

The primary pulley shaft 121 is rotatably supported by bearing materials 125, 126. The primary pulley shaft 121 internally includes a hydraulic oil passage (not illustrated). The hydraulic oil passage is connected to the hydraulic control circuit of the hydraulic control device 9, where the hydraulic oil supplied from the hydraulic control device 9 to the primary hydraulic chamber 124 flows in.

The primary fixing sieve 122 is formed to a conical plate shape, and is arranged to integrally rotate with the primary pulley shaft 121 at a position facing the primary movable sieve 123. The primary fixing sieve 122 is formed as an annular part that projects radially outward from the outer periphery of the primary pulley shaft 121. That is, the primary fixing sieve 122 is integrally arranged on the outer periphery of the primary pulley shaft 121. The primary fixing sieve 122 may be a separate body from the primary pulley shaft 121.

The primary movable sieve 123 is formed to a conical plate shape, and is supported to be movable in the axial direction with respect to the primary pulley shaft 121 and to be integrally rotatable with the primary pulley shaft 121 by spline fitting.

The primary fixing sieve 122 and the primary movable sieve 123 form a V-shaped primary groove 127 between the surface facing the primary movable sieve 123 of the primary fixing sieve 122 and the surface facing the primary fixing sieve 122 of the primary movable sieve 123. The endless belt 104 is wound around the primary groove 127. In other words, the belt 104 is arranged to be sandwiched between the primary fixing sieve 122 and the primary movable sieve 123.

The primary hydraulic chamber 124 is configured by a primary movable sieve sandwiching and pressing force acting surface 123a serving as a pressure acting surface of the rear surface on the side opposite to the surface facing the primary fixing sieve 122 of the primary movable sieve 123, and a ring-shaped primary piston 128 fixed to the primary pulley shaft 121. A cylindrical projection 123b that projects out in one direction in the axial direction, that is, to the side opposite to the primary fixing sieve 122 is formed on the primary movable sieve sandwiching and pressing force acting surface 123a of the primary movable sieve 123. A primary hydraulic chamber seal member (not illustrated) such as a seal ring is arranged between the projection 123b and the primary piston 128. That is, the primary movable sieve sandwiching and pressing force acting surface 123a of the primary movable sieve 123 and the primary piston 128 configuring the primary hydraulic chamber 124 are sealed by the seal member. The bearing material 126 and the primary piston 128 are fixed with respect to the primary pulley shaft 121 by a lock nut 129.

The hydraulic oil flowed into the hydraulic oil passage (not illustrated) of the primary pulley shaft 121 is supplied to the primary hydraulic chamber 124. That is, the hydraulic control device 9 supplies the hydraulic oil to the primary hydraulic chamber 124, slidably moves the primary movable sieve 123 in the axial direction by the hydraulic pressure of the primary hydraulic chamber 124, and approaches or separates the primary movable sieve 123 with respect to the primary fixing sieve 122. The primary hydraulic chamber 124 generates the belt sandwiching force with respect to the belt 104 wound around the primary groove 127 by acting the movable sieve pressing force for pressing the primary movable sieve 123 towards the primary fixing sieve 122 side in the axial direction on the primary movable sieve sandwiching and pressing force acting surface 123a by the hydraulic oil supplied to the primary hydraulic chamber 124. That is, the primary pulley 102 generates the belt sandwiching force with respect to the belt 104 by the hydraulic pressure of the primary hydraulic chamber 124, and changes the axial position of the primary movable sieve 123 with respect to the primary fixing sieve 122 by the generated belt sandwiching force. The primary hydraulic chamber 124 has a function of changing the transmission ratio γ of the belt type continuously variable transmission 101.

In other words, the primary pulley 102 of the present embodiment corresponds to the rotation member on the input side of the present invention, and also corresponds to a transmission ratio changing means of the present invention for changing the transmission ratio by the pressure of the hydraulic oil supplied to the primary hydraulic chamber 124 serving as the transmission shift control pressure chamber.

The secondary pulley 103 is the other pulley and transmits the engine torque transmitted to the primary pulley 102 by the belt 104 to the reduction drive gear (not illustrated), and transmits to the drive wheel 27 through the power transmission mechanism 24, the differential gear 25, and the drive shaft 26. In other words, the secondary pulley 103 to which the drive force from the primary pulley 102 is output is the other one of the two pulleys arranged in the belt type continuously variable transmission 101.

The secondary pulley 103 is configured by the secondary pulley shaft 131, the secondary fixing sieve 132, the secondary movable sieve 133, and a secondary hydraulic chamber 134 serving as the contacting surface pressure control pressure chamber for adjusting the tensile force of the belt 104 by causing the secondary pulley 103 to generate the belt sandwiching force and changing the contacting surface pressure of the primary fixing sieve 122, the secondary fixing sieve 132, the primary movable sieve 123, the secondary movable sieve 133 and the belt 104 according to the input torque.

The secondary pulley shaft 131 is rotatably supported by bearing materials 135, 136. The secondary pulley shaft 131 internally includes the hydraulic oil passage (not illustrated). The hydraulic oil passage is connected to the hydraulic control device 9, where the hydraulic oil supplied from the hydraulic control device 9 to the secondary hydraulic chamber 134 flows thereto.

The primary pulley shaft 121 and the secondary pulley shaft 131 described above are arranged to be substantially parallel to each other.

The secondary fixing sieve 132 is formed to a conical plate shape, and is arranged to integrally rotate with the secondary pulley shaft 131 at a position facing the secondary movable sieve 133. The secondary fixing sieve 132 is formed as an annular part that projects radially outward from the outer periphery of the secondary pulley shaft 131. That is, the secondary fixing sieve 132 is integrally arranged on the outer periphery of the secondary pulley shaft 131 in the modification. The secondary fixing sieve 132 may be a separate body from the secondary pulley shaft 131.

The secondary movable sieve 133 is formed to a conical plate shape, and is supported to be movable in the axial direction with respect to the secondary pulley shaft 131 and to be integrally rotatable with the secondary pulley shaft 131 by spline fitting.

The secondary fixing sieve 132 and the secondary movable sieve 133 form a V-shaped secondary groove 137 between the surface facing the secondary movable sieve 133 of the secondary fixing sieve 132 and the surface facing the secondary fixing sieve 132 of the secondary movable sieve 133. The endless belt 104 is wound around the secondary groove 137. In other words, the belt 104 is arranged to be sandwiched between the secondary fixing sieve 132 and the secondary movable sieve 133.

The secondary hydraulic chamber 134 is configured by a secondary movable sieve sandwiching and pressing force acting surface 133a of the rear surface on the side opposite to the surface facing the secondary fixing sieve 132 of the secondary movable sieve 133, and a ring-shaped secondary piston 138 fixed to the secondary pulley shaft 131. A cylindrical projection 133b that projects out in one direction in the axial direction, that is, to the side opposite to the secondary fixing sieve 132 is formed on the secondary movable sieve sandwiching and pressing force acting surface 133a of the secondary movable sieve 133. A secondary hydraulic chamber seal member (not illustrated) such as a seal ring is arranged between the projection 133b and the secondary piston 138. That is, the secondary movable sieve sandwiching and pressing force acting surface 133a of the secondary movable sieve 133 and the secondary piston 138 configuring the secondary hydraulic chamber 134 are sealed by the seal member. The bearing material 135 and the secondary piston 138 are fixed with respect to the secondary pulley shaft 131 by a lock nut 139b. The bearing material 136 is fixed with respect to the secondary pulley shaft 131 by a lock nut 139a. A parking gear 108 is arranged between the bearing material 136 and the secondary fixing sieve 132.

The hydraulic oil flowed into the hydraulic oil passage (not illustrated) of the secondary pulley shaft 131 is supplied to the secondary hydraulic chamber 134. That is, the hydraulic control device 9 supplies the hydraulic oil to the secondary hydraulic chamber 134, slidably moves the secondary movable sieve 133 in the axial direction by the hydraulic pressure of the secondary hydraulic chamber 134, and approaches or separates the secondary movable sieve 133 with respect to the secondary fixing sieve 132. The secondary hydraulic chamber 134 generates the belt sandwiching force with respect to the belt 104 wound around the secondary groove 137 by acting the movable sieve pressing force for pressing the secondary movable sieve 133 towards the secondary fixing sieve side in the axial direction on the secondary movable sieve sandwiching and pressing force acting surface 133a by the hydraulic oil supplied to the secondary hydraulic chamber 134. That is, the secondary pulley 103 generates the belt sandwiching force with respect to the belt 104 by the hydraulic pressure of the secondary hydraulic chamber 134, and changes the axial position of the secondary movable sieve 133 with respect to the secondary fixing sieve 132 by the generated belt sandwiching force. The secondary hydraulic chamber 134 bears one part of the function of maintaining the contact radius of the belt 104 with respect to the primary pulley 102 and the secondary pulley 103 constant by controlling the tensile force of the belt 104.

In other words, the secondary pulley 103 of the present embodiment corresponds to the rotation member on the output side of the present invention, and also corresponds to a contacting surface pressure changing means of the present invention for changing the contacting surface pressure of the primary fixing sieve 122, the secondary fixing sieve 132, the primary movable sieve 123, the secondary movable sieve 133 and the belt 104 by the pressure of the hydraulic oil supplied to the secondary hydraulic chamber 134 serving as the contacting surface pressure control pressure chamber.

The belt 104 transmits the drive force, that is, the engine torque input from the engine 21 (drive source) to the primary pulley 102 to the secondary pulley 103. The belt 104 is wound between the primary groove 127 of the primary pulley 102 and the secondary groove 137 of the secondary pulley 103. The belt 104 is an endless belt configured by a great number of metal belt elements and a plurality of steel rings.

The ECU 60 controls the drive of each unit of the belt type continuously variable transmission 101 according to the operation state (traveling state) of the vehicle mounted with the belt type continuously variable transmission 101 to control the actual transmission ratio, which is the actual transmission ratio of the belt type continuously variable transmission 101. The ECU 60 determines the target transmission ratio, which is the target transmission ratio, based on the operation state such as the engine rotation number, the throttle opening, the accelerator opening, the engine rotation number, the input rotation number, the output rotation number, and the shift position detected by various sensors, and drives the hydraulic control device 9 to perform the hydraulic pressure control to adjust the hydraulic pressure of the primary hydraulic chamber 124 and the hydraulic pressure of the secondary hydraulic chamber 134. That is, the ECU 60 duty controls the drive current supplied to the flow rate control valve (not illustrated) of the hydraulic control device 9 based on the control command value to adjust the hydraulic pressure of the primary hydraulic chamber 124 and the hydraulic pressure of the secondary hydraulic chamber 134, and approaches and separates the primary movable sieve 123 and the secondary movable sieve 133 with respect to the primary fixing sieve 122 and the secondary fixing sieve 132, respectively. The ECU 60 also approaches and separates the primary movable sieve 123 and the secondary movable sieve 133 with respect to the primary fixing sieve 122 and the secondary fixing sieve 132 to adjust the belt sandwiching force in the primary pulley 102 and the belt sandwiching force in the secondary pulley 103, and control the transmission ratio γ, which is the ratio of the input rotation number or the rotation number of the primary pulley 102 and the output rotation number or the rotation number of the secondary pulley 103, so that control can be performed such that the actual transmission ratio, which is the actual transmission ratio, becomes the target transmission ratio, which is the target transmission ratio.

The control system 90A of the present modification is configured to include the primary pulley 102 serving as the transmission ratio changing means of the present invention for changing the transmission ratio by the pressure of the hydraulic oil supplied to the primary hydraulic chamber 124 serving as the transmission shift control pressure chamber, and the secondary pulley 103 serving as the contacting surface pressure changing means for the present invention for changing the contacting surface pressure of the primary fixing sieve 122, the secondary fixing sieve 132, the primary movable sieve 123, the secondary movable sieve 133, and the belt 104 by the pressure of the hydraulic oil supplied to the secondary hydraulic chamber 134 serving as the contacting surface pressure control pressure chamber. In this case, the secondary pulley 103 has the secondary fixing sieve 132 corresponding to the first sandwiching member for acting the sandwiching force on the belt 104, and the secondary movable sieve 133 corresponding to the second sandwiching member for acting the sandwiching force on the belt 104. The relationship of the transmission ratio changing means and the contacting surface pressure changing means may be the opposite, that is, the primary pulley 102 may serve as the contacting surface pressure changing means and the secondary pulley 103 may serve as the transmission ratio changing means.

The lubricating system 90B serving as a supply system different from the control system 90A of the present modification is configured to include a slidably moving portion (portion to be spline fitted) of the primary pulley shaft 121 and the primary movable sieve 123, a slidably moving portion (portion to be spline fitted) of the secondary pulley shaft 131 and the secondary movable sieve 133, the bearing materials 125, 126, 135, 136, the hydraulic oil passage connecting thereto, and the like.

According to the belt type continuously variable transmission 101 configured as above as well, the belt type continuously variable transmission 101 and the hydraulic control device 9 can suppress the actual discharge flow rate of the hydraulic oil to the control system 90A from lacking with respect to the necessary flow rate of the hydraulic oil to the control system 90A due to the delay in the rise of the actual total discharge flow rate of the main pump 96 and the subpump 97 by controlling the control system 90A and executing the transmission shift delay control of relatively delaying the transmission shift when the discharge volume of the hydraulic oil to the control system 90A switches from a relatively small volume to a relatively large volume with the transmission shift, and hence the discharge volume of the hydraulic oil can be appropriately switched according to the operation state. Therefore, the belt type continuously variable transmission 101, the hydraulic control device 9 can prevent the contacting surface pressure of the primary fixing sieve 122, the secondary fixing sieve 132, the primary movable sieve 123, the secondary movable sieve 133, and the belt 104 from becoming too low with respect to the input torque and the belt 104 from slipping when the discharge volume of the hydraulic oil to the control system 90A by the pump device 92 switches from a relatively small volume to a relatively large volume with sudden transmission shift.

INDUSTRIAL APPLICABILITY

Therefore, the medium pressure control device of the continuously variable transmission and the continuously variable transmission according to the present invention can appropriately switch the discharge volume of the operating medium according to the operation state and can be suitably applied to the medium pressure control device of the continuously variable transmission and the continuously variable transmission for transmitting drive force from the internal combustion or the electric motor, which is the drive source, to the road surface at an optimum condition corresponding to the traveling state of the vehicle.

The invention claimed is:

1. A medium pressure control device of a continuously variable transmission in which a drive force is transmittable from a rotation member on an input side to a rotation member on an output side through a transmitting member, and in which a transmission ratio or a rotation speed ratio of the rotation member on the input side and the rotation member on the output side is changeable in a non-step wise manner, the medium pressure control device of the continuously variable transmission comprising:
  a first pump that discharges an operating medium to a control system, which controls a contacting surface pressure of the rotation members and the transmitting member and the transmission ratio by a pressure of the operating medium;
  a second pump that discharges the operation medium to the control system or a lubricating system different from the control system;
  a switching unit configured to switch a discharging destination of the operating medium in the second pump between the control system and the lubricating system; and
  an electronic control unit which is configured to control the control system and relatively delay a transmission shift when the discharging destination of the operating medium in the second pump is switched from the lubricating system to the control system than a case where the discharging destination of the operating medium in the second pump is the lubricating system,
  wherein the lubricating system has a lower flow rate of the operating medium than a flow rate of the operating medium in the control system.

2. The medium pressure control device of the continuously variable transmission according to claim 1, wherein the electronic control unit controls the control system and relatively delays a start time point of the transmission shift in response to the switch of the discharging destination of the operating medium in the second pump from the lubricating system to the control system.

3. The medium pressure control device of the continuously variable transmission according to claim 1, wherein the electronic control unit controls the control system and relatively lowers a transmission shift speed of the transmission shift when the discharge volume of the operating medium to the control system by the first pump switches from a relatively small volume to a relatively large volume with the transmission shift.

4. The medium pressure control device of the continuously variable transmission according to claim 1, wherein the electronic control unit delays the transmission shift in a period from start of the switching of the discharge volume of the second pump to end of the switching of an actual discharge volume of the second pump to a relatively large volume.

5. The medium pressure control device of the continuously variable transmission according to claim 1, further comprising a switching control unit that controls the pump unit and relatively increases a switching speed of the discharge volume of the operating medium to the control system when the electronic control unit controls the control system and delays the transmission shift.

6. The medium pressure control device of the continuously variable transmission according to claim 1, wherein the control system is configured to include a transmission ratio changing unit that changes the transmission ratio by a pressure of the operating medium supplied to a transmission shift control pressure chamber, and a contacting surface pressure changing unit that changes the contacting surface pressure by a pressure of the operating medium supplied to a contacting surface pressure control pressure chamber.

7. A continuously variable transmission comprising:
   a medium pressure control device of a continuously variable transmission according to claim 1; and
   a power roller configuring the transmission member.

8. A continuously variable transmission comprising:
   a medium pressure control device of a continuously variable transmission according to claim 1; and
   a belt configuring the transmission member.

9. The medium pressure control device of the continuously variable transmission according to claim 1, wherein the lubricating system is maintained lower pressure than the control system.

10. The medium pressure control device of the continuously variable transmission according to claim 1, wherein the first pump and the second pump are driven in synchronization with a rotation of the rotation member on the input side.

\* \* \* \* \*